(12) United States Patent
Puxty et al.

(10) Patent No.: US 11,602,714 B2
(45) Date of Patent: Mar. 14, 2023

(54) PROCESS AND SYSTEM FOR CAPTURE OF CARBON DIOXIDE

(71) Applicant: COMMONWEALTH SCIENTIFIC AND INDUSTRIAL RESEARCH ORGANISATION, Australian Capital Territory (AU)

(72) Inventors: Graeme Douglas Puxty, New South Wales (AU); William Conway, New South Wales (AU); Qi Yang, Victoria (AU); Paul Hubert Maria Feron, New South Wales (AU)

(73) Assignee: COMMONWEATH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 49 days.

(21) Appl. No.: 17/392,867

(22) Filed: Aug. 3, 2021

(65) Prior Publication Data

US 2021/0362090 A1   Nov. 25, 2021

Related U.S. Application Data

(63) Continuation of application No. 16/317,134, filed as application No. PCT/AU2018/050488 on May 22, 2018, now Pat. No. 11,123,684.

(30) Foreign Application Priority Data

May 22, 2017   (AU) .................. 2017901937

(51) Int. Cl.
   *B01D 53/14*   (2006.01)
   *C01B 32/50*   (2017.01)
   (Continued)

(52) U.S. Cl.
   CPC ..... *B01D 53/1493* (2013.01); *B01D 53/1475* (2013.01); *B01D 53/62* (2013.01);
   (Continued)

(58) Field of Classification Search
   CPC ............ B01D 53/1493; B01D 53/1475; B01D 53/62; B01D 53/78; B01D 2252/2041;
   (Continued)

(56) References Cited

U.S. PATENT DOCUMENTS

2011/0014100 A1 *   1/2011   Bara ..................... B01D 53/62
                                                              423/437.1
2015/0125372 A1    5/2015   Stites et al.

FOREIGN PATENT DOCUMENTS

CA    2780194 A1    6/2011
WO    2009/143376 A2    11/2009

OTHER PUBLICATIONS

Examination Report dated Aug. 1, 2022 issued by Japan Patent Office on corresponding Patent Application 2019-564438.
(Continued)

*Primary Examiner* — Anita Nassiri-Motlagh
(74) *Attorney, Agent, or Firm* — Ladas & Parry LLP

(57) ABSTRACT

A process for absorbing carbon dioxide from a gas stream containing carbon dioxide, including the steps of contacting the gas stream with an aqueous composition including a substituted heteroaromatic compound having a six-membered heteroaromatic ring with from 1 to 3 nitrogen atoms in the heteroaromatic ring and at least one substituent wherein at least one of the substituents is of formula —$R^1NH_2$ wherein $R^1$ is selected from $C_1$ to $C_6$ alkylene and ethers of formula —$R^2$—O—$R^3$— wherein $R^2$ and $R^3$ are $C_1$ to $C_3$ alkylene.

20 Claims, 9 Drawing Sheets

(51) Int. Cl.
    *B01D 53/62* (2006.01)
    *B01D 53/78* (2006.01)
(52) U.S. Cl.
    CPC .............. *B01D 53/78* (2013.01); *C01B 32/50* (2017.08); *B01D 2252/2041* (2013.01); *B01D 2252/20421* (2013.01); *B01D 2252/20426* (2013.01); *B01D 2252/20431* (2013.01); *B01D 2252/20457* (2013.01); *B01D 2252/20473* (2013.01); *B01D 2252/20484* (2013.01); *B01D 2252/504* (2013.01); *B01D 2257/504* (2013.01)
(58) Field of Classification Search
    CPC ........... B01D 2252/20421; B01D 2252/20426; B01D 2252/20431; B01D 2252/20457; B01D 2252/20473; B01D 2252/20484; B01D 2252/504; B01D 2257/504; C01B 32/50
    USPC ........................................................ 423/229
    See application file for complete search history.

(56) References Cited

OTHER PUBLICATIONS

Deepika Maihotra et al.: Industrial & Engineering Chemistry Research, Jun. 3, 2017, 56, 7534-7540.
Examination Report dated Dec. 24, 2021 issued by the Japanese Patent Office on corresponding Patent Application 2019-564436.

\* cited by examiner

PROCESS AND SYSTEM FOR CAPTURE OF CARBON DIOXIDE

RELATED APPLICATION INFORMATION

This application is a CONTINUATION of application Ser. No. 16/317,134 filed on Jan. 11, 2019, which is a 371 of International Application PCT/AU2018/050488 filed May 22, 2018 which claims priority from Australia Application No. 2017901937 filed May 22, 2017, the disclosures of which are incorporated in their entirety by reference herein.

FIELD

The invention relates to a process and system for capture of carbon dioxide from gas streams.

BACKGROUND

Emission of carbon dioxide is considered the main cause of the greenhouse effect and global warming. In the Kyoto Protocol the United Nations Framework Convention on Climate Change has set targets for the reduction of greenhouse gas emissions.

One method of reducing atmospheric $CO_2$ emissions is through its capture and subsequent geological storage. In post combustion capture, the $CO_2$ in flue gas is first separated from nitrogen and residual oxygen using a suitable solvent in an absorber. The $CO_2$ is then removed from the solvent in a process called stripping (or regeneration), thus allowing the solvent to be reused. The stripped $CO_2$ is then liquefied by compression and cooling, with appropriate drying steps to prevent hydrate formation. Post combustion capture in this form is applicable to a variety of $CO_2$ sources including power stations, steel plants, cement kilns, calciners, biogas plants, natural gas processing, methane reforming and smelters.

Aqueous amine solutions and alkanolamine solutions in particular, have been investigated as solvents in post combustion $CO_2$ capture. The capture process involves a series of chemical reactions that take place between water, the amine and carbon dioxide. Amines are weak bases, and may undergo acid-base reactions. Once dissolved into the amine solution, the aqueous $CO_2$ reacts with water and the neutral form of the amine react to generate carbamate, protonated amine, carbonic acid ($H_2CO_3$), aqueous bicarbonate ($HCO_3^-$) ions and aqueous carbonate ($CO_3^{2-}$) ions.

$CO_2$ desorption is achieved by heating of an aqueous amine solution containing $CO_2$. The two major effects of heating are to reduce the physical solubility of $CO_2$ in the solution, and to reduce the pKa of the amine resulting in a concomitant reduction in pH and in $CO_2$ absorption capacity, the net effect of which is $CO_2$ release. The extent of the reduction in pKa is governed by the enthalpy of the amine protonation reaction which in turn is governed by the amine chemical structure. All the other reactions, including carbamate formation, have small reaction enthalpies and are insensitive to temperature. Typically, the enthalpy of amine protonation is four to eight times larger than the enthalpies of the carbonate reactions and two to four times larger than the enthalpy of carbamate formation. It is the lowering of the pH upon heating that drives the reversal of carbamate and carbonate/bicarbonate formation during desorption, rather than any significant reduction in stability.

The cyclic capacity ($\alpha_{cyclic}$) of an aqueous amine solution is defined as the moles of $CO_2$ that can be absorbed and released per mole of amine by cycling the absorbent between low temperature ($\alpha_{rich}$) and high temperature ($\alpha_{lean}$): $\alpha_{cyclic}=\alpha_{rich}-\alpha_{lean}$. In terms of chemistry, this cyclic capacity is primarily governed by the change in amine pKa with temperature. The larger this cyclic capacity, the more efficient the amine. 30 wt % monoethanolamine, which is currently employed in industrial $CO_2$ capture, possesses an undesirable cyclic capacity of approximately $\alpha_{cyclic}$=0.11 (40° C.-80° C.).

US Publication 2015/0367281 describes a process for absorption of an acid gas which involves contacting the acid gas with a benzylamine compound and a cosolvent which reduces the vapour pressure of the benzylamine. The use of certain cosolvents also ameliorates the problem precipitate formation due to low solubility of the anion formed from reaction of the benzylamine compound with carbon dioxide.

There remains a need to identify amines and systems which provide improved properties and/or reduce problems in carbon dioxide capture and release.

SUMMARY OF INVENTION

The invention provides a process for absorbing carbon dioxide from a gas stream containing carbon dioxide, comprising contacting the gas stream with an aqueous absorbent composition comprising a substituted heteroaromatic compound comprising an six-membered heteroaromatic ring comprising from 1 to 3 nitrogen atoms in the heteroaromatic ring and at least one substituent wherein at least one substituent is of formula —$R^1NH_2$ wherein $R^1$ is selected from the group consisting of $C_1$ to $C_6$ alkylene and ethers of formula —$R^2$—O—$R^3$— wherein $R^2$ and $R^3$ are $C_1$ to $C_3$ alkylene.

In one embodiment there is further provided a composition of adsorbed carbon dioxide comprising:
  A. an aqueous solvent;
  B. at least one absorbent compound for carbon dioxide comprising a substituted heteroaromatic compound comprising a six membered heteroaromatic ring comprising from 1 to 3 nitrogen atoms in the heteroaromatic ring and at least one substituent, wherein at least one of the substituents is, of formula —$R^1NH_2$ wherein $R^1$ is selected from the group consisting of $C_1$ to $C_6$ alkylene and ethers of formula —$R^2$—O—$R^3$— wherein $R^2$ and $R^3$ are $C_1$ to $C_3$ alkylene; and
  C. absorbed carbon dioxide, wherein the absorbed carbon dioxide is at a concentration above the equilibrium concentration when the solution is exposed to air at below the boiling point of the solvent.

In yet a further embodiment there is provided a use of an aqueous solution of a substituted heteroaromatic compound in capture of carbon dioxide in a gas stream comprising carbon dioxide, wherein the substituted heteroaromatic compound comprises a heteroaromatic six-membered ring comprising from 1 to 3 nitrogen atoms in the heteroaromatic ring and at least one substituent wherein at least of the substituents is of formula —$R^1NH_2$ wherein $R^1$ is selected from the group consisting of $C_1$ to $C_6$ alkylene, $C_1$ to $C_6$ oxy-alkylene and ethers of formula —$R^2$—O—$R^3$— wherein $R^2$ and $R^3$ are $C_1$ to $C_3$ alkylene.

In one set of embodiments the concentration of substituted heteroaromatic compound is 1 wt % to 80 wt % of the aqueous composition, preferably 10 wt % to 80 wt % of the aqueous composition.

In one set of embodiments the amount of water in the aqueous composition at least 10 wt %, preferably at least 20 wt %.

The process of the invention may also be carried out using a further absorbent for carbon dioxide in addition to the substituted heteroaromatic compound. The weight ratio of the substituted heteroaromatic compound to further absorbent may, for example, be from 1:10 to 10:1.

The substituted heteroaromatic compound of the composition provides a high cyclic capacity for carbon dioxide allowing efficient capture and desorption of carbon dioxide while also providing a low vapour pressure in aqueous solution and good solubility of the substituted heteroaromatic compound and species formed on absorption of carbon dioxide. The aqueous composition may therefore be used without a requirement for specific co-solvents and provides flexibility in formulating aqueous compositions for carbon dioxide capture and release.

We have found that the long term stability of the substituted heteroaromatic compound during $CO_2$ capture, particularly where $R^1$ is methylene, is enhanced in the presence of a further amine of higher basicity than the substituted heteroaromatic compound. In a preferred embodiment the absorbent further comprises an amine selected from tertiary amines and primary and secondary sterically hindered amines and mixtures thereof having a higher basicity than the substituted heteroaromatic compound. In particular, in the case where $R^1$ is methylene such as for (aminomethyl) pyridines the further amine selected from tertiary amines and primary and secondary sterically hindered amines and mixtures thereof typically has a pKa of at least 8.85 at 25° C. A pKa of 8.85 is about 0.25 above the pKa of (aminomethyl)pyridines specifically each of 2-(aminomethyl)pyridine, 3-(aminomethyl)pyridine and 4-(aminomethyl)pyridine.

As used herein, except where the context requires otherwise, the term "comprise" and variations of the term, such as "comprising", "comprises" and "comprised", are not intended to exclude further additives, components, integers or steps.

DETAILED DESCRIPTION

Brief Description of Drawings

Examples of the invention are described with reference to the attached drawings.

In the drawings.

Figure 1:
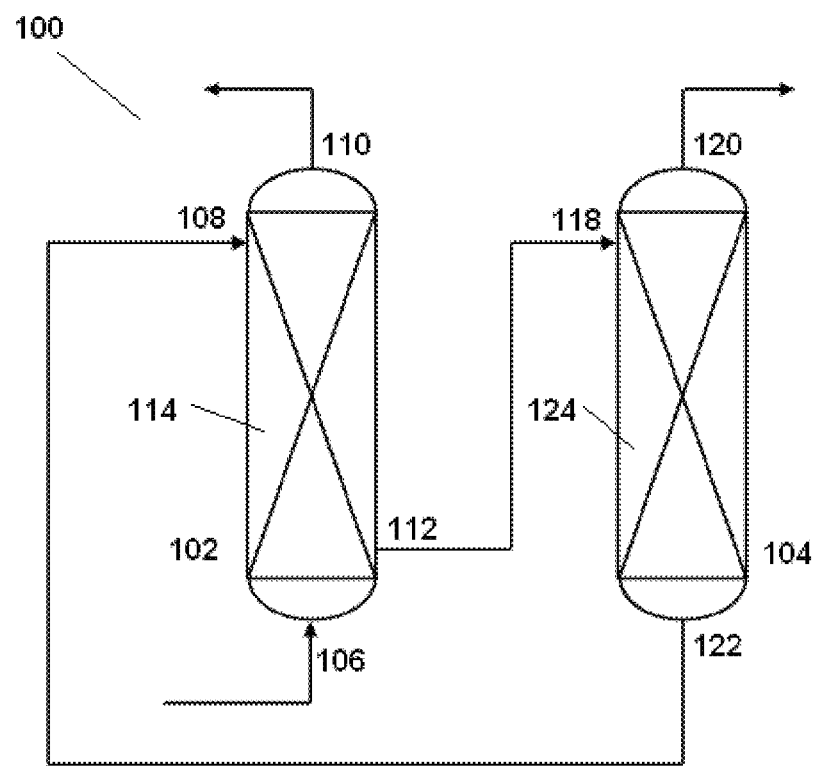
FIG. 1 is a schematic diagram of a system used for removing carbon dioxide from a gas mixture according to the present invention.

The aqueous absorbent composition for absorption of carbon dioxide from the gas stream comprises an optionally substituted six-membered heteroaromatic ring comprising from 1 to 3 nitrogen atoms in the heteroaromatic ring and at least one substituent wherein at least one substituent is of formula —$R^1NH_2$ wherein $R^1$ is selected from the group consisting of $C_1$ to $C_6$ alkylene and ethers of formula —$R^2$—O—$R^3$— wherein $R^2$ and $R^3$ are $C_1$ to $C_3$ alkylene.

In one set of embodiments the optionally substituted six membered heteroaromatic ring is of formula (I):

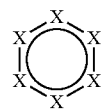

(I)

wherein

X is independently selected from N and the group CR where at least three of X are CR;

R are independently selected from the group consisting of hydrogen, $C_1$ to $C_4$ alkyl, hydroxy, hydroxy-$C_1$ to $C_4$ alkyl, $C_1$ to $C_4$ alkoxy, $C_1$ to $C_4$ alkoxy-($C_1$ to $C_4$ alkyl) and at least one R is the group of formula —$R^1$—$NH_2$ wherein $R^1$ is selected from the group consisting of $C_1$ to $C_6$ alkylene, $C_1$ to $C_6$ oxyalkylene and ethers of formula —$R^2$—O—$R^3$— where $R^2$ and $R^3$ are $C_1$ to $C_3$ alkylene. $R^1$ is most preferably methylene.

Preferred compounds of formula I are selected from formula Ia, Ib, Ic, Id and mixtures of two or more thereof:

Ia

Ib

Ic

Id wherein
$R^1$ is a carbon substituent and is selected from the group consisting of $C_1$ to $C_6$ alkylene and ethers of formula —$R^2$—O—$R^3$ wherein $R^2$ and $R^3$ are $C_1$ to $C_3$ alkylene and $R^1$ is most preferably methylene;

$R^4$ is an optional carbon substituent selected from the group consisting of $C_1$ to $C_4$ alkyl, hydroxy, hydroxy —$C_1$ to C4 alkyl, $C_1$ to $C_4$ alkoxy, $C_1$ to $C_4$ alkoxy-($C_1$ to $C_4$ alkyl); and
n is 0, 1 or 2.

Preferably formula I is of formula Ia:

Ia wherein
$R^1$ is a carbon substituent and is selected from the group consisting of $C_1$ to $C_6$ alkylene and ethers of formula —$R^2$—O—$R^3$ wherein $R^2$ and $R^3$ are $C_1$ to $C_3$ alkylene and $R^1$ is preferably methylene;

$R^4$ is an optional carbon substituent selected from the group consisting of $C_1$ to $C_4$ alkyl, hydroxy, hydroxy —$C_1$ to $C_4$ alkyl, —$C_1$ to $C_4$ alkoxy, $C_1$ to $C_4$ alkoxy-($C_1$ to $C_4$ alkyl); and
n is 0, 1 or 2.

Still more preferably the substituted heteroaromatic compound is selected from the group consisting of formula IIa, IIb, IIc and mixtures of two or more thereof:

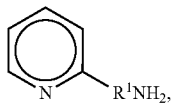

IIa

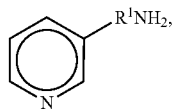

IIb

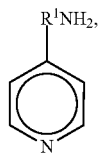

IIc wherein $R^1$ is selected from the group consisting of $C_1$ to $C_4$ alkylene, preferably methylene.

The substituted heteroaromatic compound includes a substituent group $R^1$ which is a group that links the amino group ($NH_2$) to the heteroaromatic ring. Specific examples of the substituent $R^1$ may be selected from the group consisting of:
—$CH_2$—, —$CH_2CH_2$—, —$CH_2CH_2$ ($CH_3$)—, —$CH_2$($CH_3$)$CH_2$—$CH_2$($CH_2$—$CH_3$); and
—$CH_2CH_2$—$OCH_2CH_2$—.

Examples of optionally substituted heteroaromatic compounds are selected from the group consisting of 2-[amino($C_1$ to $C_4$ alkyl)]pyridine, 3-[amino($C_1$ to $C_4$ alkyl)]pyridine and 4-[amino($C_1$ to $C_4$ alkyl)]pyridine.

Examples of substituted heteroaromatic compounds include aminomethylpyridines including 2-(aminomethyl)pyridine, 3-(aminomethyl)pyridine and 4-(aminomethyl)pyridine 3-aminoethyl pyridine, 3-(amino-2-methylethyl)pyridine, 3-(1-aminopropyl)pyridine, 3-(2-aminopropyl)pyridine or mixture of two or more thereof. Most preferably the substituted heteroaromatic compound is selected from the group of 2-(aminomethyl)pyridine, 3-(aminomethyl)pyridine, 4-(aminomethyl)pyridine and mixture of two or more thereof.

The absorbent composition need not include ionic liquids or organic salts such as imidazolium cation or quaternary ammonium salts and will typically include a water content of more than 15 wt % of the absorbent composition such as at least 20 wt %.

Compositions of the substituted heteroaromatic compound, particularly the (aminomethyl)pyridines, have lower susceptibility to thermal and oxidative degradation than a 30 wt % MEA solution due to the inherent chemical stability imparted by the heteroaromatic ring structure. Preferably the cyclic absorption capacity of the solution for $CO_2$ is comparable to that of a tertiary or sterically hindered amine solution and the rate of absorption of the target gas is comparable to or better than a 30 wt % MEA solution.

At least one of the substituted heteroaromatic compounds may constitute the total of the carbon dioxide absorbent compound or may be present in solution with other suitable carbon dioxide absorbent compounds so that the total gas absorbent compounds comprise one or more gas absorbent compounds in addition to the substituted heteroaromatic compound. The substituted heteroaromatic compound preferably comprises at least 1 wt %, more preferably 1 wt % to 80 wt %, still more preferably 1.5 wt % to 80 wt %, even more preferably 5 wt % to 80 wt %, more preferably 10 wt % to 80 wt %, such as 15 wt % to 80 wt %, 20 wt % to 80 wt % or 25 wt % to 80 wt % relative to the total weight of the solution. In some embodiments the concentration of the substituted heteroaromatic compound in the aqueous composition is from 30 wt % to 80 wt % such as 40 wt % to 80 wt %, 50 wt % to 80 wt % or 60 wt % to 80 wt %. The high solubility of the substituted heteroaromatic compound allows high loadings to be used in aqueous solution and also provides a solution stable intermediate in the carbon dioxide absorption process. It therefore provides significant practical advantages in this respect when compared with benzyl amine and its derivatives.

The total wt % of the at least one absorbent compound (including the substituted heteroaromatic compound) in solution is preferably at least 20 wt %, more preferably at least 25 wt %, still more preferably at least 30 wt %, even more preferably at least 40 wt % and yet even more preferably at least 50 wt % relative to the total weight of the solution. This component will typically consists of the substituted heteroaromatic compound and optionally one or more compounds selected from amines and in the preferred embodiment at least one of the aminomethyl substituted heteroaromatic compounds and one or more amines selected from tertiary amine or sterically hindered primary or secondary amine which has a higher basicity than the substituted heteroaromatic compounds.

In one set of embodiments the absorbent composition may comprise:

the heteroaromatic compound in an amount of 10 wt % to 80 wt % such as 15 wt % to 80 wt %, 20 wt % to 80 wt % or 25 wt % to 80 wt % relative to the total weight of the solution;

optionally a further amine absorbent for carbon dioxide in an amount of up to 70 wt % such as from 10 wt % to 70 wt %;

water in an amount of at least 10 wt % such as from 10 wt % to 90 wt % or 20 wt % to 80 wt %.

Further components may be present such as solvents solutes or other materials.

When the additional amine absorbent for carbon dioxide is present the weight ratio of the substituted heteroaromatic to further amine may, for example, be in the range of from 99:1 to 1:10 such as 1:10 to 10:1 or 1:5 to 5:1.

In one embodiment the solution contacted with the gas stream comprises one or more additional carbon dioxide gas absorbing compounds selected from amines and imidazoles in addition to the substituted heteroaromatic compound. The one or more additional amines may be selected from primary, secondary and tertiary amines.

Examples of suitable amines include primary amines such as monoethanolamine, ethylenediamine, 2-amino-2-methyl-1-propanol, 2-amino-2-methyl-ethanolamine and benzylamine; secondary amines such as N-methylethanolamine, piperazine, piperidine and substituted piperidine, 3-piperidinemethanol, 3-piperidineethanol, 2-piperidinemethanol, 2-piperidineethanol, diethanolamine, diglycolamine and diisopropanolamine; and tertiary amines such as N-methyldiethanolamine, N-piperidinemethanol, N-piperidineethanol, N, N-dimethylaminoethanol and 3-quinuclidinol; imidazole and N-functionalised imidazole and amino acids such as taurine, sarcosine and alanine.

The process is particularly effective in capture of $CO_2$ in the presence of a further amine component selected from tertiary amines and sterically hindered primary and secondary amines.

We have found through pilot plant testing that (aminomethyl)heteroaromatics, particularly the (aminomethyl)pyridines, degrade slowly when the gas stream contains a significant oxygen component which is often the case in combustion gas streams. The resulting product of oxidation is an imine which is a dimer. The formation of the dimer is understood to occur according to the scheme shown below:

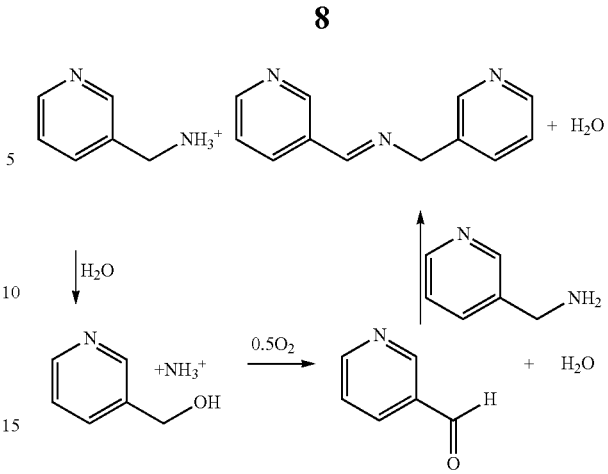

The mode of degradation is considered to be unique to aminomethyl substituted aromatics and aminomethyl substituted heteroaromatics as the same dimer stability arising through conjugation with the aromatic ring is not possible for alkyl chains. The above scheme and stabilisation of the imine is consistent with a synthetic scheme reported for the preparation of more complex heterocyclics such as aromatic and heteroaromatic substituted benzimidazoles in *Green Chem.*, 2013 15, 2713-2717. The resulting imine is favoured as it forms a stable conjugated pi-bonding arrangement. This stabilisation does not extend to aminoalkylsubstituted heteroaromatics in which the alkyl linking group is ethyl or longer chain alkyl which undergo degradation via similar pathways to aliphatic amines such as the formation of carboxylic acids, aldehydes and amino acids (C Gouedard, D Picq, F Launay, P-L Carrette; *Int. J. Greenh. Gas Con.*, 10, 244 (2012)).

We have found that formation of the imine and resulting degradation of the aminomethyl-substituted heteroaromatic is inhibited in the presence of an amine, particularly a tertiary amine or sterically hindered primary or secondary amine which has a higher basicity than the aminomethyl-substituted heteroaromatic. For example a pKa at least 0.25 higher than the pKa of the aminomethylheteroaromatic. In the case of (aminomethyl)pyridines the $pK_a$ of 2-(aminomethyl)pyridine, 3-(aminomethyl) pyridine and 4-(aminomethyl)pyridine at 25° C. is 8.6. It is preferred that the further amine particularly a sterically hindered amine or tertiary amine have a pKa of at least 8.85 such as a pKa of at least 9, a pKa of 8.85 to 11.5 or pKa of 9 to 11.5. It is considered that the higher basisity adsorbs protons from the acid gas in solution thereby inhibiting the initial step in the degradation process. In practice the combined use of an (aminomethyl) pyridine with an amine selected from the group consisting of tertiary amines and sterically hindered primary and secondary amines and mixtures thereof of higher basicity, such as 2-amino-2-methyl-1-propanol has been found to very dramatically reduce the imine formation and resultant degradation of the (aminomethyl)pyridine.

As used herein the term "sterically hindered amine" is defined as those compounds containing at least one primary or secondary amino group attached to either a secondary or tertiary carbon atom. In one embodiment the sterically hindered amine is a secondary amino group attached to either a secondary or tertiary carbon atom or a primary amino group attached to a tertiary carbon atom. Examples of suitable sterically hindered amines and tertiary amines include those shown in the following table with the corresponding pKa at 25° C.

| Base | pK$_a$ at 25° C. |
|---|---|
| 2-amino-1-propanol | 9.5 |
| 2-amino-2-methyl-1-propanol | 9.7 |
| piperidine | 11.1 |
| 2-piperidinylmethanol | 10.1 |
| 3-piperidinylmethanol | 10.4 |
| 4-piperidinylmethanol | 10.6 |
| 2-piperidinylethanol | 10.5 |
| 4-piperidinylethanol | 10.6 |
| 2-(dimethylamino)ethanol | 9.2 |

Other suitable tertiary amines and sterically hindered amines of the required basicity will be readily apparent to those skilled in the art having regard to the above reference degradation mechanism and method of inhibition of imine formation.

Accordingly in a preferred aspect the further amine optionally present in the composition is present in an amount of 10 wt % to 70 wt % the absorbent. In a further aspect the absorbent comprises:

10 wt % to 80 wt % of (aminomethyl)pyridine comprising one or more of 2-(aminomethyl)pyridine, 3-(aminomethyl)pyridine and 4-(aminomethyl)pyridine;

10 wt % to 70 wt % of amine selected from tertiary amines and sterically hindered primary and secondary amines and mixtures thereof of pKa at least 8.85, preferably from 2-amino-1-propanol, 2-amino-2-methyl-1-propanol, piperidine, 2-piperidinylmethanol, 3-piperidinylmethanol, 4-piperidinylmethanol, 2-piperidinylethanol, 4-piperidinylethanol and 2-(dimethylamino)ethanol, and most preferably 2-amino-2-methyl-1-propanol; and 20 wt % to 80 wt % water.

In a further embodiment the absorbent comprises:

20 wt % to 60 wt % of (aminomethyl)pyridine comprising one or more of 2-(aminomethyl)pyridine, 3-(aminomethyl)pyridine and 4-(aminomethyl)pyridine;

10 wt % to 50 wt % of amine selected from tertiary amines and sterically hindered primary and secondary amines and mixtures thereof of pKa at least 8.85, preferably from 2-amino-1-propanol, 2-amino-2-methyl-1-propanol, piperidine, 2-piperidinylmethanol, 3-piperidinylmethanol, 4-piperidinylmethanol, 2-piperidinylethanol, 4-piperidinylethanol and 2-(dimethylamino)ethanol, and most preferably 2-amino-2-methyl-1-propanol; and 20 wt % to 70 wt % water.

The tertiary and sterically hindered amines are typically soluble in the composition at the desired concentration at 25° C. Preferably the tertiary and sterically hindered amines are water soluble at 25° C.

In a further embodiment, the solution comprises an amine absorbent selected from imidazole and more preferably an N-functionalised imidazole. Suitable N-functionalised imidazoles may be found in U.S. Pat. No. 8,741,246, which is incorporated herein by reference.

The suitable N-functionalised imidazoles disclosed in U.S. Pat. No. 8,741,246 are of formula (2):

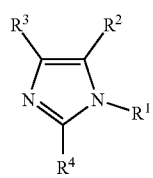

(2)

wherein

R$^1$ is substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted amino, substituted or unsubstituted alkoxyl, substituted or unsubstituted aryloxyl, silyl, siloxyl, cyano, or nitro; and R$^2$, R$^3$, and R$^4$ are each independently selected from hydrogen, halogen, hydroxyl, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, aryloxyl, substituted or unsubstituted amino, cyano, or nitro.

Specific examples of such compounds include the 1-N—(C$_1$ to C$_{20}$ alkyl) imidazoles such as 1-butyl imidazole.

In some, embodiment the solution comprises a combination of N-functionalised imidazoles and one or more amines in addition to the substituted heteroaromatic compound.

The one or more amines which may be used in addition to the N-functionalised imidazoles may be selected from the group consisting of primary, secondary and tertiary amines including the specific examples of such amines referred to above.

In another aspect of the invention there is provided a process for removing carbon dioxide gas from a gas mixture including: contacting a gas mixture that is rich in carbon dioxide with an absorbent solution, as described above, to form a target gas rich solution and a gas mixture that is lean in target gas; and desorbing the carbon dioxide gas from the solution. In yet a further set of embodiments there is further provided use of a substituted heteroaromatic compound in aqueous solution at a concentration of at least 20% by weight, based on the total weight of the solution, for absorbing carbon dioxide from a gas stream. Desorbing the carbon dioxide may be facilitated by an increase in temperature, reduction in pressure, change in pH or combination of these factors. It is a significant advantage of the invention that the cyclic capacity of CO$_2$ brought about by these changes is generally speaking higher for the substituted heteroaromatic compound used in the process of the invention than the molar equivalent of other absorbents such as monoethanolamine.

In one set of embodiments there is further provided a composition comprising an aqueous solution for carbon dioxide gas comprising:

A. an aqueous solvent;
B. at least one absorbent compound comprising the substituted heteroaromatic compound; and
C. an absorbed carbon dioxide, at a concentration above the equilibrium concentration when the solution is exposed to air at below the boiling point of the solvent.

Preferably, the concentration of the absorbed carbon dioxide is at least two times (and even more preferably at least five times) the equilibrium concentration when the solution is exposed to air at below the boiling point of the aqueous solvent, thus representing the absorbed carbon dioxide concentration in the solvent during the absorption process as previously described. The background amount of $CO_2$, will generally be less than 0.1% by weight based on the total weight of the solution. In one embodiment the absorbed carbon dioxide will constitute at least 0.2% by weight based on the total weight of the solution on absorption of the gas more preferably at least 1% and still more preferably at least 10% absorbed carbon dioxide by weight based on the total weight of the solution.

In one embodiment the solution comprises one or more amines in addition to the substituted heteroaromatic compound which additional amines may, for example, be selected from primary, secondary and tertiary amines optionally including N-functionalised imidazoles such as those of formula (2).

In a set of embodiments the total of the absorbent component and water constitute at least 40%, preferably at least 50%, more preferably at least 60%, still more preferably at least 70% and even more preferably at least 80% (such as at least 90%) by weight of the total composition.

FIG. 1 provides an illustration of an embodiment of a process for capture of carbon dioxide from a flue gas stream. The process (100) includes an absorption reactor (102), for absorbing $CO_2$ from a flue gas stream, and a desorption reactor (104) for desorbing $CO_2$.

The absorption reactor (102) includes a first inlet (106), a second inlet (108), a first outlet (110), and a second outlet (112), and a gas absorption contact region (114). The first inlet (106) of the absorption reactor (102) is a flue gas inlet through which a $CO_2$ rich flue gas enters the absorption column (102). The second inlet (108) is an absorbent solution inlet for the aqueous absorbent (such as the substituted heteroaromatic absorbent solutions hereinbefore described) through which a $CO_2$ lean absorbent enters the absorption column (102). The $CO_2$ rich flue gas and the $CO_2$ lean absorbent contact in the gas absorption contact region (114). In this region the $CO_2$ in the $CO_2$ rich flue gas is absorbed into the absorbent solution where it is bound in solution to form a $CO_2$ lean flue gas and a $CO_2$ rich absorbent solution.

In conducting the process of the invention the aqueous composition may comprise a mixture of optionally substituted heteroaromatic compounds.

The local environment of the solution may be altered in the absorption column to favour the absorption reaction, e.g. to increase absorption of $CO_2$ into solution where it is bound to the substituted heteroaromatic compound. Such alterations of the local environment may include a change in pH, a change in solution temperature, a change in pressure etc. Alternatively, or additionally, the solution may include other compounds which assist in the absorption of $CO_2$. These compounds may alter the affinity or absorption capacity of the substituted heteroaromatic compound for $CO_2$, or these compounds may also absorb $CO_2$.

If additional compounds are added to the absorbent solution in the absorption reactor (102), the process may additionally include means to remove these compounds.

The absorption of $CO_2$ from the $CO_2$ rich flue gas into the absorbent solution results in a $CO_2$ lean gas and a $CO_2$ rich absorbent solution. The $CO_2$ lean gas may still include some $CO_2$, but at a lower concentration than the $CO_2$ rich flue gas, for example a residual concentration of $CO_2$.

The $CO_2$ lean gas leaves the absorption column (102) through the first outlet (110), which is a $CO_2$ lean gas outlet. The $CO_2$ rich absorbent solution leaves the absorption column through the second outlet (112), which is a $CO_2$ rich absorbent outlet.

The aqueous composition may, if desired, include solvents in addition to water in order to modify solubility of the substituted aromatic compound and/or other absorbents which may be present composition. Examples of cosolvents may, for example, be selected from the group consisting of glycols, glycol derivatives selected from the group consisting of glycol ethers, glycol ether esters, glycol esters, long chain short chain aliphatic alcohols such as $C_1$ to $C_4$ alkanols, long chain aliphatic alcohols, long chain aromatic alcohols, amides, esters, ketones, phosphates, organic carbonates and organo sulfur compounds.

Desorption reactor (104) includes an inlet (118), a first outlet (120), a second outlet (122), and a gas desorption region (124). The $CO_2$ rich absorbent outlet (112) of the absorption column (102) forms the inlet (118) of the desorption column (104). Desorption of $CO_2$ from the $CO_2$ rich solution occurs in the gas desorption region (124).

Desorption of $CO_2$ from the $CO_2$ rich solution may involve the application of heat or a reduction in pressure to favour the desorption process. Furthermore, additional compounds may be added to the $CO_2$ rich solution to enhance the desorption process. Such compounds may alter the solution environment, for example by changing solution pH or altering another parameter to favour the desorption reaction.

Removal of $CO_2$ from the $CO_2$ rich solution results in the formation of a $CO_2$ lean gas stream and a $CO_2$ lean absorbent solution. The $CO_2$ lean absorbent solution may still include some $CO_2$, but at a lower concentration than the $CO_2$ rich solution, for example a residual concentration of $CO_2$.

The $CO_2$ gas stream is taken off via the first outlet (120), which is a $CO_2$ outlet. The $CO_2$ lean absorbent solution is taken off via the second outlet (122), which is a $CO_2$ lean absorbent solution outlet. The $CO_2$ lean absorbent is then recycled and fed through the second inlet (108) to the absorption column (102).

The invention may be used to absorb carbon dioxide from gas streams having a wide range of carbon dioxide concentration such as from 1 volume % to 99 volume % carbon dioxide. The invention is of particularly practical use in the absorption of carbon dioxide from gas streams, such as flue gas stream, resulting from combustion for fossil fuels such as coal, oil and gas. Typically the carbon dioxide content of such gas streams is in the range of from 3 volume % to 30 volume %. The invention is particularly suited to the capture of carbon dioxide from combustion of fossil fuels and having a carbon dioxide content in the range of from 8 volume % to 20 volume %. Levels of carbon dioxide in the range from 8 volume % to 20 volume % are typically present in the flue gas stream from combustion of fuel gas, fuel oil and coal.

The invention may also be used in capture of other acid gases together with carbon dioxide, such as sulfur dioxide, which may be present in gas streams from combustion of fossil fuels from specific geological sources. The process of the invention provides removal of a substantial amount of $CO_2$ from the gas stream. For example, in some embodiments, greater than or equal to 50% by volume (vol %); specifically greater than or equal to 70 vol %. Following removal of carbon dioxide from the gas stream in accordance with the invention the lean carbon dioxide gas stream from fossil fuel combustion typically contains no more than about 2 volume % carbon dioxide and more preferably no more than 1.5 volume % carbon dioxide.

The invention will now be described with reference to the following Examples. It is to be understood that the examples are provided by way of illustration of the invention and that they are in no way limiting to the scope of the invention.

EXAMPLES

The chemical abbreviations used in the specification have the following meaning:
AMPy: (aminomethyl)pyridine
2-AMPy: 2-(aminomethyl)pyridine
3-AMPy: 3-(aminomethyl)pyridine
4-AMPy: 4-(aminomethyl)pyridine
MEA: monoethanolamine
AMP: 2-amino-2-methyl-1-propanol
BZA: benzylamine
DMEA: dimethylethanolamine

Example 1

2-AMPy, 3-AMPy, and 4-AMPy were evaluated for $CO_2$ mass transfer rates together with blends of the amines with monoethanolamine (MEA), 2-amino-2-methyl-1-propanol (AMP), and N,N-dimethylethanolamine (DMEA).

AMPy's have larger $CO_2$ absorption rates than MEA at low $CO_2$ loadings. Above 0.3 $CO_2$ loading, $CO_2$ absorption rates fall below MEA. AMPy's absorption rates are faster than sterically hindered and tertiary amine absorbents. Equimolar blending with MEA results in faster $CO_2$ absorption rates at low $CO_2$ loadings at a similar overall concentration to MEA while maintaining a similar absorption rate to MEA at high $CO_2$ loadings above 0.3.

AMPy's and their blends were evaluated here for their $CO_2$ absorption rates using a wetted-wall column contactor.

Experimental Method

Figure 2:
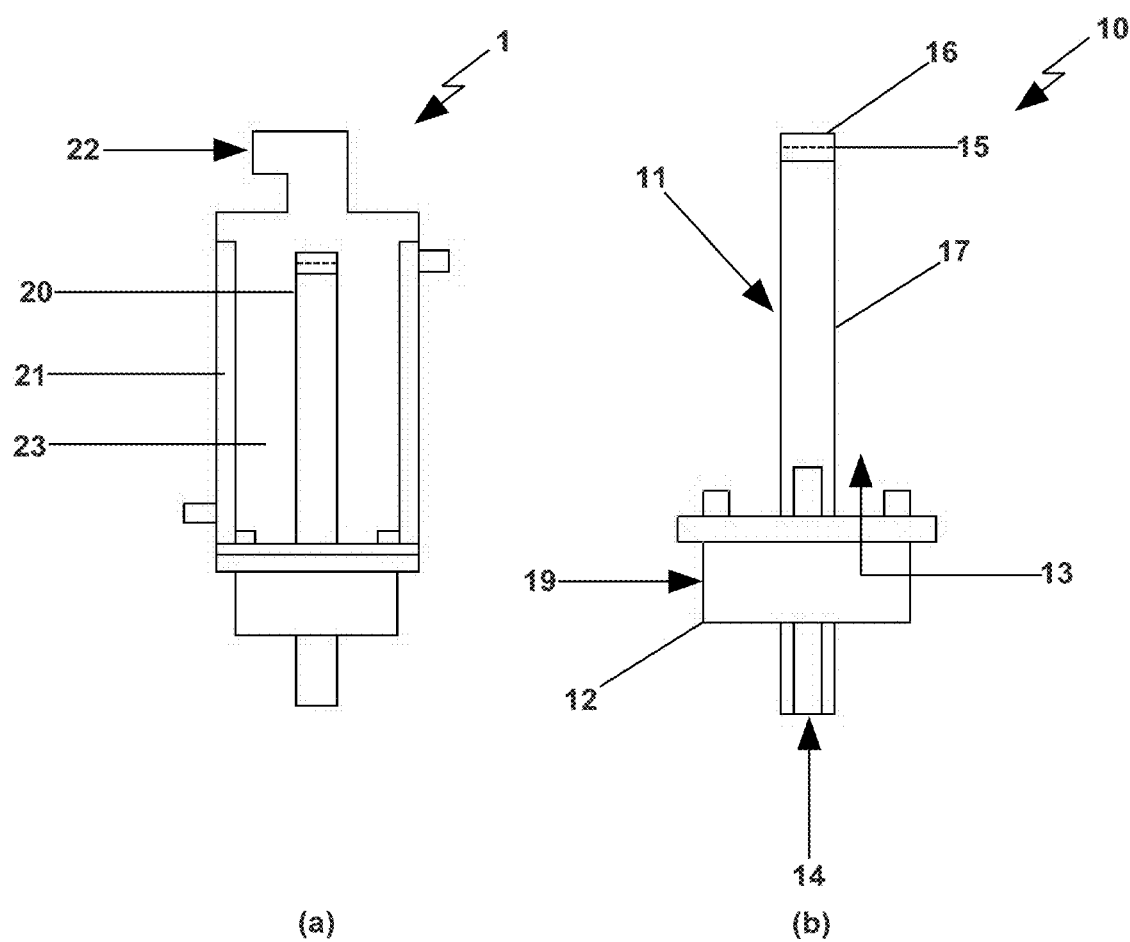
FIG. 2 show part sectioned views of Wetted Wall Column (WWC) apparatus and the column portion of the WWC apparatus used in evaluating and comparing $CO_2$ absorption rates.

A general schematic of the Wetted Wall Column (WWC) apparatus is shown in FIG. 2a and an expanded view of the column portion of the WWC is shown in FIG. 2b. The WWC apparatus (1) is comprised of a first portion (10) comprising a hollow stainless steel column (11) extending from a base (12) having an inlet (13) for gas stream containing carbon dioxide and received in a second housing portion (20) comprising a temperature controlled jacket (21) and a gas outlet (22). The column (11) has an effective height and diameter of 8.21 cm and 1.27 cm respectively. About 0.65 L of amine solution within in a submerged reservoir held in a temperature controlled water bath is pumped up the inside (14) of the column (11) before exiting through small outlet holes (15) in the top (16) of the column (11). The exiting liquid falls under gravity over the outside (17) of the column (11) forming a thin liquid film before collecting at the base (12) of the column portion (10). The solution is returned from an outlet (19) on the base (12) to a reservoir in a closed loop configuration. Thus, the liquid flowing over the outside (16) of column (12) is constantly replenished with fresh amine solution from the reservoir. The temperature of the column (20) and surrounding gas space (23) is controlled by a glass jacket (21) connected to the water bath.

The total liquid flow rate within the apparatus was maintained at 121.4 mL·min$^{-1}$ (2.02 mL·s$^{-1}$) as indicated by a calibrated liquid flow meter. A mixed $CO_2/N_2$ gas was prepared by variation of Bronkhorst mass flow controllers for $CO_2$ and $N_2$ respectively to achieve a total gas flow rate of 5.0 L min$^{-1}$. Prior to entering the column (12) the gas stream is passed through a ⅛" steel coil and saturator located in a water bath. Liquid and gas flow rates were selected to achieve a constant smooth and ripple free liquid film on the outside of the column (12). The absorption flux into the amine solutions, $N_{CO2}$, was measured as a function of dissolved $CO_2$ loadings from 0.0-0.4 moles $CO_2$/total mole amine and over a range of $CO_2$ partial pressures spanning 1.0-20.0 kPa. The composition of the gas stream prior to and exiting the housing (20) was monitored via a Horiba VA-3000 IR gas analyser. $CO_2$ loaded amine solutions were prepared by bubbling a pure $CO_2$ gas stream into a known volume of amine solution and the resulting mass change in the solution used to indicate $CO_2$ loading. A tower of condensers was connected to the outlet of the flask to ensure loss of amine and water vapour was minimised.

The amount of $CO_2$ absorbing into the amine liquid was determined from the $CO_2$ content of the gas stream entering (bottom) and exiting (top) the housing (20). The former was measured while bypassing the absorption column with the gas stream passing directly to the gas analyser. The absorption flux, expressed in millimoles (mmoles) of $CO_2$ absorbed per second per unit area of contact between liquid amine and gas, was determined over a range of $CO_2$ partial pressures in each of the amine solutions and $CO_2$ loadings.

$CO_2$ mass transfer co-efficients, $K_G$, incorporate the processes of physical absorption and chemical reaction, into a single value. Ideally, absorbents with larger $CO_2$ mass transfer rates result in smaller absorption equipment and significant cost reductions.

Figure 3:
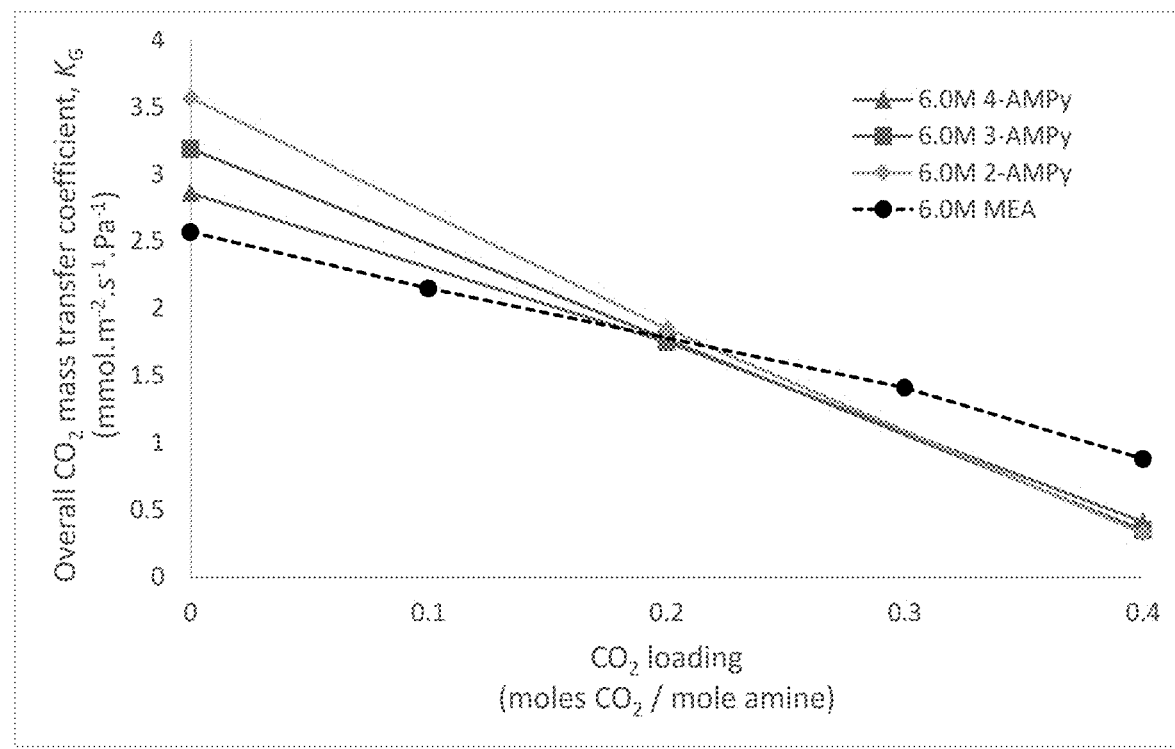
FIG. 3 is a graph including 5 plots showing the overall $CO_2$ mass transfer coefficients, $K_G$, at 40.0° C. for a series of aqueous (aminomethyl)pyridine (AMPy) absorbents and aqueous monoethanolamine (MEA) from 0.0-0.4 $CO_2$/mole amine. The (aminomethyl)pyridines examined include 2-(aminomethyl)pyridine (2-AMPy), 3-(aminomethyl)pyridine (3-AMPy) and 4-(aminomethyl)pyridine (4-AMPy) each at a concentration of 6.0M. Monoethanolamine (MEA) is included for comparison. The plots, at left hand side of the graph are in the order of, from to bottom, 2-AMPy, 3-AMPy, 4-AMPy, MEA.
Figure 4:
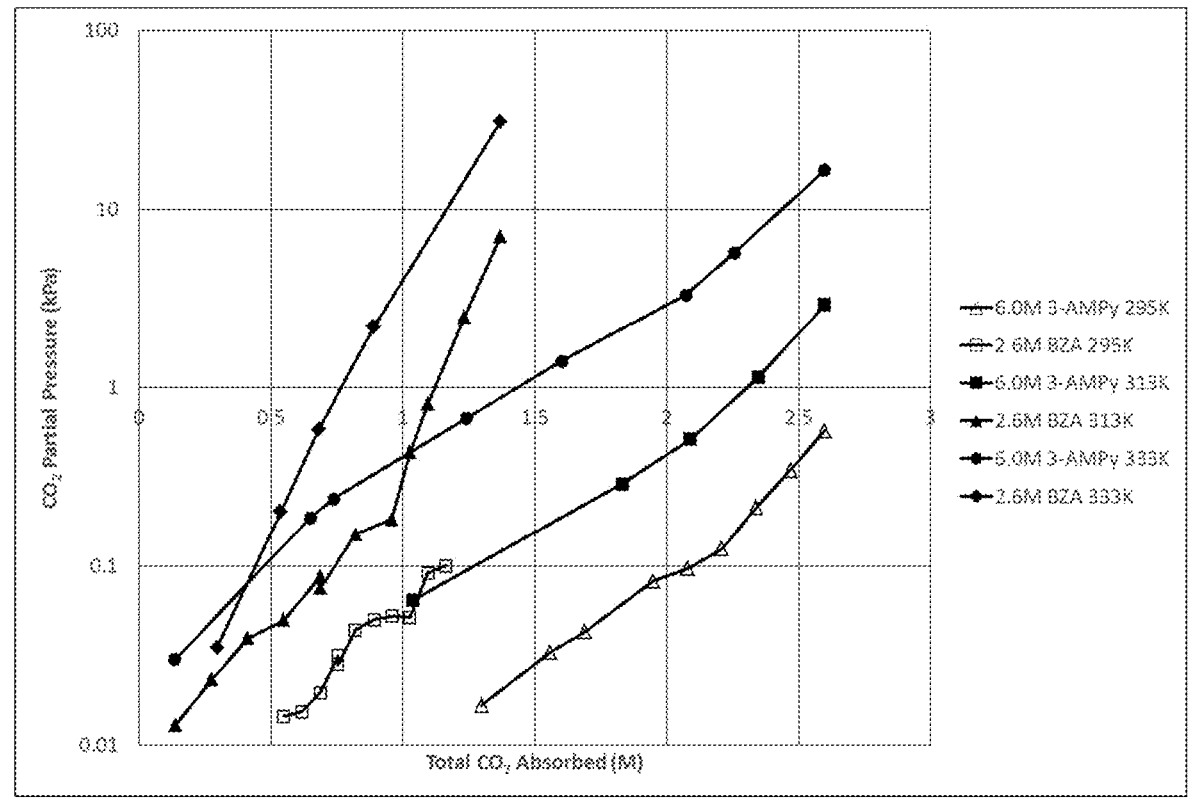
FIG. 4 is a graph of vapour liquid equilibria data comparing the amount of $CO_2$ absorbed as a function of $CO_2$ partial pressure for 6.0M 3-AMPy and 2.6M BZA each at 295K and 313K and 333K. The additional capacity of the more concentrated 3-AMPy absorbent is apparent.
Figure 5:
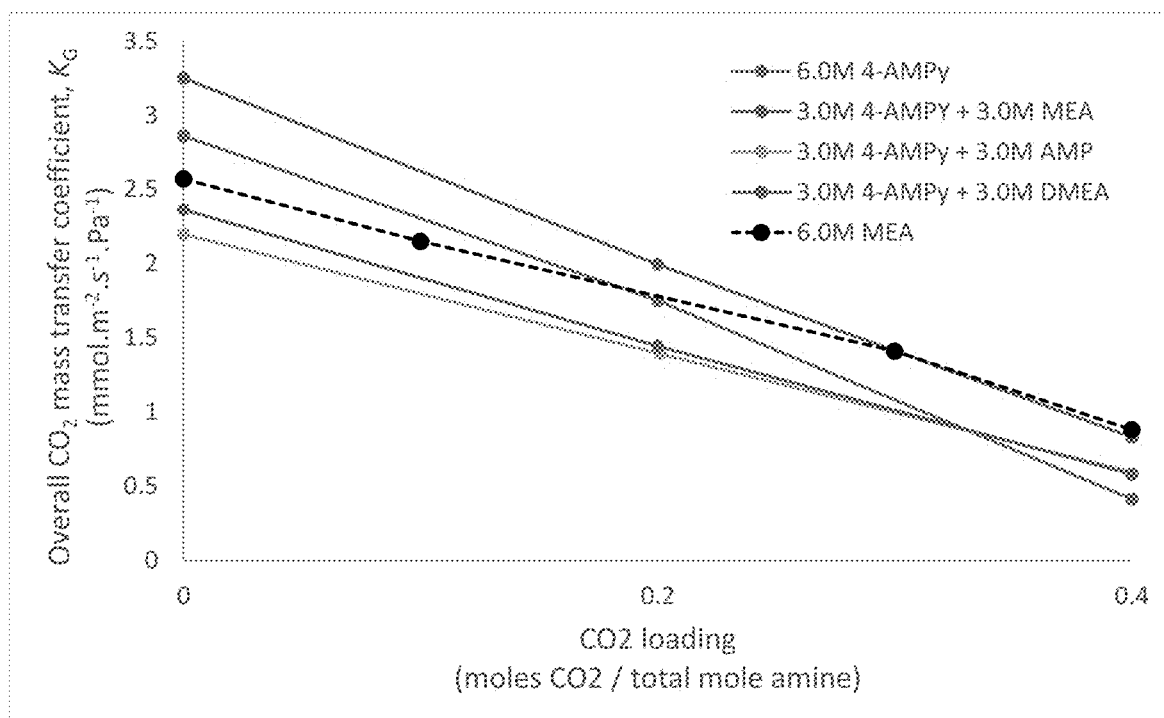
FIG. 5 is a graph having 5 plots showing the overall $CO_2$ mass transfer coefficients ($K_G$) at 40° C. for a series of 4-AMPy absorbents and blends of from 0.0 to 0.4 moles $CO_2$/moles amine. The plots include, from top to bottom at the left hand side of the graph: 3M 4-AMPy+3.0M MEA, 6.0M 4-AMPy, 6.0M MEA, 3.0M 4-AMPy+3.0M DMEA and 3.0M 4-AMPy+3.0M AMP.
Figure 6:
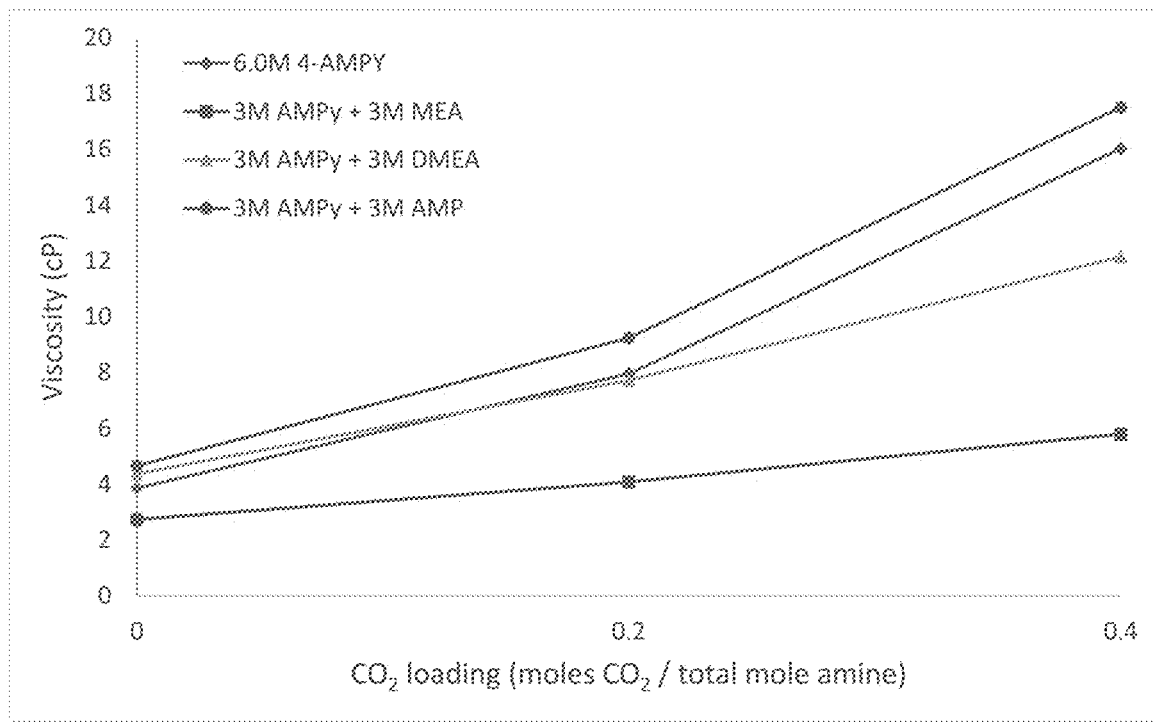
FIG. 6 is a graph including 4 plots viscosity of absorbent solutions at 40° C. against $CO_2$ loadings from 0.0-0.4 molesCO2/total moles amine for aqueous absorbent solution including absorbent solutions of, from top to bottom at the left hand side of the graph: 3.0M 4-AMPy+3.0M AMP; 3.0M 4-AMP+3.0M DMEA; 6M 4-AMPy; and 3.0M 4-AMPy+3.0M MEA.

$K_G$ values as a function of $CO_2$ loading are presented in 1, FIG. 3 and FIG. 4. From the curves in the figures $CO_2$ mass transfer is faster in 4-AMPy solutions at low $CO_2$ loadings compared to MEA at similar concentrations. The absorption rate declines with increasing $CO_2$ loading and is 50% lower than MEA towards higher loadings of 0.4. In practice this does not present an issue due to the faster absorption at low $CO_2$ loading which offsets the lower rate at high loading. The larger cyclic capacity also means the AMPy's tend to more easily be stripped to low loadings where the mass transfer is shown in Table 4.

The trend in $K_G$ at low $CO_2$ loadings follows 2-AMP>3-AMPy>4-AMPy. The superior reactivity of 2 and 3-AMPy over 4-AMPY respectively is believed to extend from the increased basicity of the amines. $CO_2$ mass transfer is similar among the AMPy's at high $CO_2$ loadings. Equimolar blends of 3.0M 3-AMPY with DMEA and AMP result in lower $CO_2$ mass transfer rates than 6.0M MEA over the entire $CO_2$ loading range. A similar blend of 4-AMPy with MEA results in increased $CO_2$ mass transfer at low $CO_2$ loadings (~35% at 0.0 $CO_2$ loading) and similar $CO_2$ mass transfer at high loadings.

TABLE 1

Overall $CO_2$ mass transfer co-efficients, $K_G$ for (aminomethyl)pyridines and their blends.

| Absorbent composition (M) | $CO_2$ loading (moles $CO_2$/ total mole amine) | Overall $CO_2$ mass transfer co-efficient, $K_G$ (mmol · m$^{-2}$ · s$^{-1}$ · Pa$^{-1}$) |
|---|---|---|
| 4-(aminomethyl)pyridine | | |
| 3.0M 4-AMPy | 0 | 1.9 |
|  | 0.2 | 1.49 |
|  | 0.4 | 0.677 |
| 5.0M 4-AMPy | 0 | 2.706 |
|  | 0.2 | 1.545 |
|  | 0.373 | 0.68 |
| 6.0M 4-AMPy | 0 | 2.86 |
|  | 0.2 | 1.75 |
|  | 0.4 | 0.412 |

TABLE 1-continued

Overall $CO_2$ mass transfer co-efficients, $K_G$ for (aminomethyl)pyridines and their blends.

| Absorbent composition (M) | $CO_2$ loading (moles $CO_2$/ total mole amine) | Overall $CO_2$ mass transfer co-efficient, $K_G$ (mmol · m$^{-2}$ · s$^{-1}$ · Pa$^{-1}$) |
|---|---|---|
| 3.0M 4-AMPy + 3.0M MEA | 0 | 3.25 |
|  | 0.2 | 1.994 |
|  | 0.4 | 0.83 |
| 3.0M 4-AMPy + 3.0M AMP | 0 | 2.197 |
|  | 0.201 | 1.392 |
|  | 0.406 | 0.572 |
| 3.0M 4-AMPy + 3.0M DMEA | 0 | 2.364 |
|  | 0.2 | 1.444 |
|  | 0.4 | 0.5799 |
| 3-(aminomethyl)pyridine | | |
| 3.0M 3-AMPy | 0 | 1.77 |
|  | 0.2 | 1.462 |
|  | 0.4 | 0.465 |
| 5.0M 3-AMPY | 0 | 2.74 |
|  | 0.2 | 1.57 |
|  | 0.4 | |
| 6.0M 3-AMPY | 0 | 3.19 |
|  | 0.2 | 1.77 |
|  | 0.4 | 0.35 |
| 3.0M 3-AMPy + 3.0M MEA | 0 | 3.56 |
|  | 0.2 | 2.16 |
|  | 0.4 | 0.702 |
| 3.0M 3-AMPy + 3.0M AMP | 0 | 2.71 |
|  | 0.2 | 1.51 |
|  | 0.4 | 0.514 |
| 2-(aminomethyl)pyridine | | |
| 3.0M 2-AMPY | 0 | 2.26 |
|  | 0.2 | 1.55 |
|  | 0.4 | 0.593 |
| 5.0M 2-AMPy | 0 | 2.88 |
|  | 0.2 | 1.82 |
|  | 0.4 | 0.459 |
| 6.0M 2-AMPy | 0 | 3.57 |
|  | 0.2 | 1.85 |
|  | 0.4 | 0.326 |

Importantly, blending with DMEA and AMP results in similar viscosities to standalone AMPy absorbents at similar concentrations and low (or zero) $CO_2$ loading. Viscosity of the 4-AMPy/AMP blend increases with $CO_2$ loading similarly to the standalone 6.0M 4-AMPy absorbent while the viscosity of the blend with DMEA increases at a slower rate (~40% lower viscosity at 0.4 loading). Viscosity of the 4-AMPy/MEA blend is substantially lower at all $CO_2$ loadings (~75% lower viscosity at 0.4 $CO_2$ loading). A number of the AMPy/MEA blends exhibited similar or larger $CO_2$ mass transfer rates than the standalone absorbents indicating that blended absorbents are useful.

The larger physical $CO_2$ solubility in the AMPy's makes up for the lower reaction kinetics.

TABLE 2

Protonation constants from 15.0-45.0° C. together with corresponding enthalpies and entropies for 2-(aminomethyl)pyridine, 3-(aminomethyl)pyridine, and 4-(aminomethyl)pyridine respectively. BZA data included for comparison.

| Temperature (° C.) | 15 | 25 | 35 | 45 | ΔH° kJ · mol$^{-1}$ | ΔS° J · mol$^{-1}$ · K$^{-1}$ |
|---|---|---|---|---|---|---|
| 1/T (K) | 0.00347 | 0.00335 | 0.00324 | 0.00314 | | |
| 4-AMPy | | | | | | |
| log K prot | 8.77 | 8.43 | 8.08 | 7.86 | −53.9 | 19.6 |
| log K carb Prot 2 | 3.84 | 3.65 | 3.48 | 3.41 | −25.5 | 15.3 |
| 3-AMPy | | | | | | |
| log K prot | 9.11 | 8.83 | 8.51 | 8.26 | −50.6 | 0.8 |
| log K carb Prot 2 | 3.42 | 3.34 | 3.25 | 3.17 | −14.5 | −15.2 |
| 2-AMPY | | | | | | |
| log K prot | 8.98 | 8.68 | 8.41 | 8.19 | −46.6 | −10.1 |
| log K carb Prot 2 | 1.96 | 1.86 | | 1.75 | −17.9 | 24.5 |
| BZA* | | | | | | |
| log K prot | 9.77 | 9.43 | 8.95 | 8.61 | −59.5 | 20 |

*Single protonation only

The table shows the larger enthalpy of reaction for the AMPy's which leads to more $CO_2$ release with increasing temperature. This contributes to the good cyclic capacity of the substituted heteroaromatic compounds.

From the data in Table 2 the first protonation constants of AMPy, log K prot, are similar to MEA and BZA and fall within a suitable range for $CO_2$ capture processes. Importantly, the large and desired protonation enthalpy ($\Delta H°$) observed for BZA is largely maintained in the AMPy derivatives (−53.9 to −46.6). This large enthalpy is a unique feature and is responsible for the superior cyclic capacity compared to other non-aromatic and cyclic amine absorbents.

TABLE 3

4-AMPy carbamate stability constants from 15.0-45.0° C. together with corresponding enthalpies and entropies for 4 and 3-(aminomethyl)pyridine.

| Temperature (° C.) | 15 | 25 | 35 | 45 | $\Delta H°$ kJ·mol$^{-1}$ | $\Delta S°$ J·mol$^{-1}$·K$^{-1}$ |
|---|---|---|---|---|---|---|
| 1/T (K) | 0.00347 | 0.00335 | 0.00324 | 0.00314 | | |
| | | | 4-AMPy | | | |
| log K carb | 2.35 | 2.22 | 2.02 | 1.84 | −30.05 | −58.97 |
| log K carb Prot | 7.15 | 6.95 | 6.69 | 6.52 | −38.08 | 4.91 |
| | | | 3-AMPy | | | |
| log K carb | 2.34 | 2.11 | 1.93 | 1.70 | −36.83 | 82.97 |
| | | | BZA | | | |
| log K carb | 2.20 | 2.01 | 1.81 | 1.58 | −36 | −82 |
| | | | MEA | | | |
| log K carb | 1.85 | 1.76 | 1.66 | 1.55 | −18 | −35 |

TABLE 4

$CO_2$ loadings and cyclic capacities for 6.0M solutions of 4-AMPy, MEA, and BZA respectively together with data for an equimolar blend containing 3.0M 4-AMPy and 3.0M MEA.

| | $CO_2$ loading @ 15kPa $CO_2$ | | |
|---|---|---|---|
| Temperature (° C.) | 40 | 120 | cyclic capacity |
| 6.0M 4-AMPy | 0.50 | 0.10 | 0.40 |
| 6.0M MEA | 0.52 | 0.32 | 0.20 |
| 6.0M BZA | 0.50 | 0.13 | 0.37 |
| 3.0M 4-AMPy + 3.0M MEA | 0.50 | 0.23 | 0.27 |

The larger cyclic capacity of the (aminomethyl)pyridines produces lower operating energy requirements of the process. As a result less absorbent is required to capture the same amount of $CO_2$ thereby lowering circulation rates and reboiler duties.

Example 2: Benzylamine Comparison

Benzylamine (BZA) has been found to form solid precipitate salts in the presence of $CO_2$, particularly at high concentrations of BZA in the liquid phase, limiting the optimum operating concentration to <30 wt % (~2.8 M). It was also found that BZA has the propensity to form small amounts of solid precipitates in the gas phase due to non-ideal liquid behaviour leading to elevated vapour pressures above those predicted by Raoult's law at low $CO_2$ loadings. As part of the absorbent screening process concentrated aqueous 3-AMPy was evaluated for its potential to form solid precipitates in the presence of $CO_2$ at high concentrations. While similar in structure to BZA the incorporation of a second nitrogen group into the aromatic ring was found to increase solubility of the carbamate product in aqueous solution. A simple bubble reactor was utilised to determine the precipitation propensity while passing a pure $CO_2$ gas stream at atmospheric pressure into a concentrated 3-AMPy solution held at ambient temperature. A concentration of 80 wt % 3-AMPy was achieved before precipitation of the carbamate salt was observed. While a precipitate was observed, it is unlikely this will occur in the pilot plant given the aggressive conditions employed in the simple lab based study. Furthermore, similar precipitation behaviour has been observed for other common aqueous amines in highly concentrated solutions but which are operated successfully in pilot plants.

Example 3: VLE Measurements for AMPy Derivatives and Blends

The capacity of an absorbent solution for $CO_2$ is a vital requirement for absorbent development. $CO_2$ capacity drives the optimum absorbent concentration, energy requirements, and liquid equilibrium (VLE) measurements are typically used to determine absorption capacities, cyclic capacities (temperature dependence), and absorption enthalpies (temperature dependence of $CO_2$ solubility at a given $CO_2$ loading). Vapour liquid equilibrium also can be predicted from knowledge of the equilibrium constants for $CO_2/H_2O$ chemistry, amine protonation, carbamate stability, and physical $CO_2$ solubility (Henry's constant). VLE data can also be used to regress equilibrium constants for carbamate stability which can be used to verify those determined from independent NMR studies (rarely available for bespoke absorbents).

The vapour liquid equilibrium apparatus used here incorporates a sealed stainless steel reactor (4 independent vessels) and high pressure $CO_2$ gas delivery system. Absorbent liquid (5.0 mls) is placed into vessels and evacuated several times to remove any residual $CO_2$ gas that may be present. The vessels are charged with high pressure nitrogen (~2.0 BAR absolute pressure) before the mass is recorded using a milligram balance. Once weighed the vessel pressure sensor is attached and the entire vessel placed into an oven at the desired temperature (40, 60, 80° C.). Following overnight equilibration, the initial pressure of the vessel (now incorporating contributions from $N_2$ and $H_2O$) is recorded and the vessel charged with $CO_2$ (~5.0 BAR absolute pressure). The vessel is weighed and the mass of $CO_2$ dosed into the vessel recorded. The vessel is returned the oven and equilibrated for 24 hours or until steady state is reached (indicated by no further changes in pressure). Samples from the vessel headspace are then analysed by gas chromatography to determine the gas phase $CO_2$ partial pressure. The liquid phase $CO_2$ loading is then determined by mass balance calculation.

The results for 6.0M 3-AMPy are shown in Table 5 below:

| 22° C. | | 40° C. | | 60° C. | |
| --- | --- | --- | --- | --- | --- |
| mol $CO_2$/mol 3-AMPy | $CO_2$ Partial Pressure (kPa) | mol $CO_2$/mol 3-AMPy | $CO_2$ Partial Pressure (kPa) | mol $CO_2$/mol 3-AMPy | $CO_2$ Partial Pressure (kPa) |
| 0.43 | 0.57 | 0.43 | 2.90 | 0.43 | 16.53 |
| 0.41 | 0.34 | 0.39 | 1.14 | 0.38 | 5.70 |
| 0.39 | 0.21 | 0.34 | 0.51 | 0.35 | 3.29 |
| 0.37 | 0.12 | 0.31 | 0.29 | 0.27 | 1.40 |
| 0.35 | 0.097 | 0.17 | 0.064 | 0.21 | 0.67 |
| 0.32 | 0.082 | | | 0.12 | 0.24 |
| 0.28 | 0.043 | | | 0.11 | 0.19 |
| 0.26 | 0.033 | | | 0.022 | 0.030 |
| 0.22 | 0.017 | | | | |

Example 4: Energy Performance and Mass Transfer

A concentrated 3-AMPy absorbent operating at 6.0M was selected as the base case given its simplicity. Alternative blends incorporating equimolar concentrations of monoethanolamine (MEA) and 2-amino-2-methyl-1-propanol (AMP) with 3-AMPy (i.e. 3.0M 3-AMPY+3.0M MEA or 3.0M AMP respectively) were selected to provide rapid kinetic or improved thermodynamics while minimising the cost of the absorbent inventory for large scale evaluation in a pilot plant.

Figure 7:
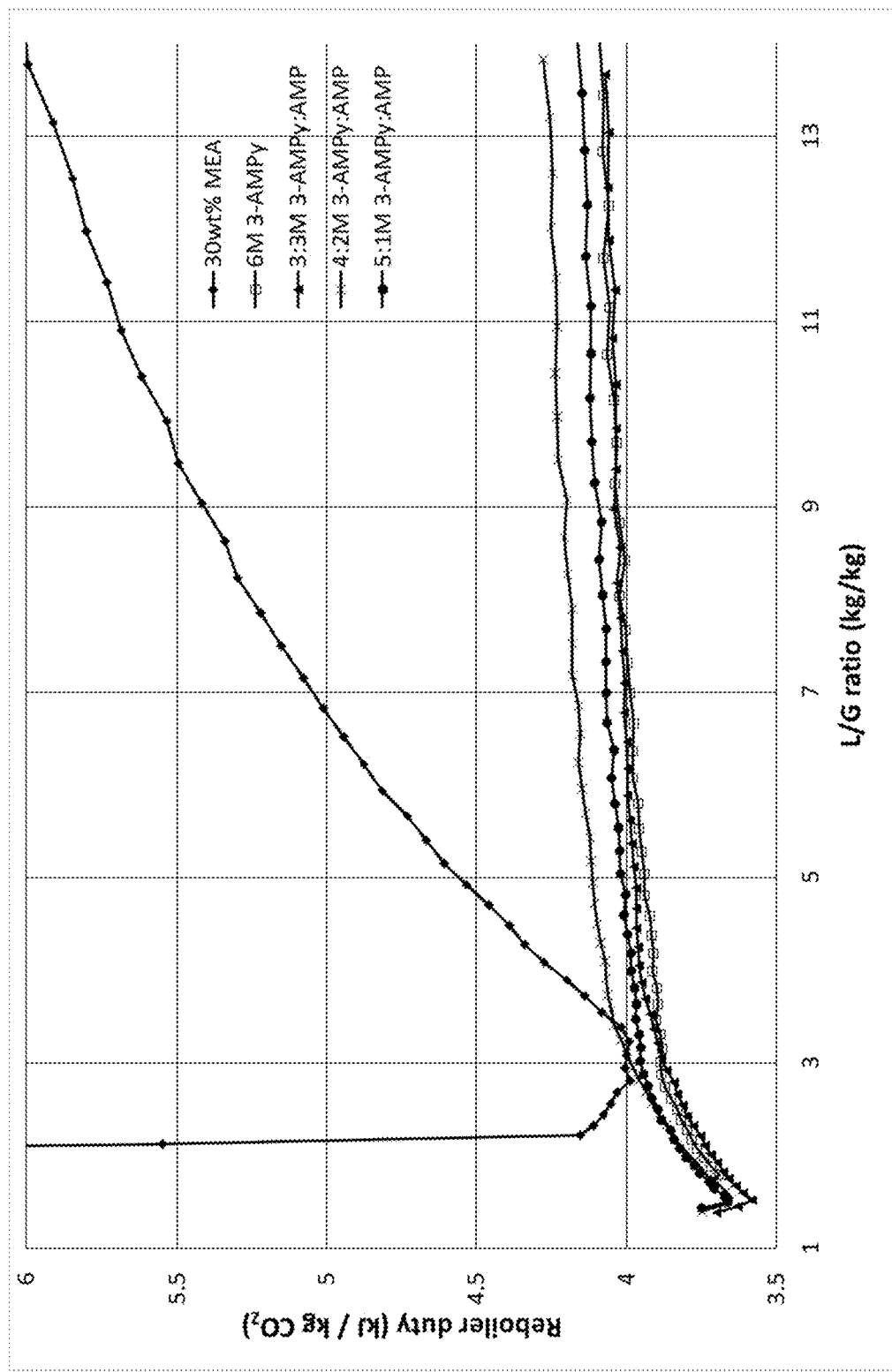
FIG. 7 is a graph having 5 plots comparing the model estimated reboiler duty (kJ/kg $CO_2$) for a range of absorbents as a function of the ratio of liquid and gas flow rates (L/G) (kg/kg) for absorbents from top to bottom at right hand side of the graph of 30 wt % MEA; 4:2 3-AMPy:AMP; 5:1M 3-AMPy:AMP; 6M 3-AMPy; 3:3M3-AMPy:AMP.

FIG. 7 of the drawings shows the model estimated reboiler duties as a function of the ratio of liquid and gas flow rates (L/G) for an isobaric stripping column with a range of aqueous absorber solutions including 6M 3-AMPy and various ratios of 3-AMPy and AMP (with 30 wt % MEA included for comparison). These represent some of the more practically useful formulations in terms of energy requirement, with formulations incorporating MEA having poorer energy performance. There is little impact from the addition of AMP. AMP was, however, found to have a significant positive effect on mass transfer.

Operation of the aqueous 6M 3-AMPy absorbent was completed over about 1 month in a pilot plant of general operation shown in FIG. 1. A parametric study was undertaken to estimate the $CO_2$ stripping energy requirement as a function of operating parameters for a traditional absorber-stripper process design. Overall favourable results were found for the energy requirement as shown in the figure below.

Unlike the previously tested formulation based on BZA, no operational issues were encountered with an aqueous solution of 6M 3-AMPy. No precipitation or foaming events occurred nor were there any issues regarding volatility.

Figure 8:
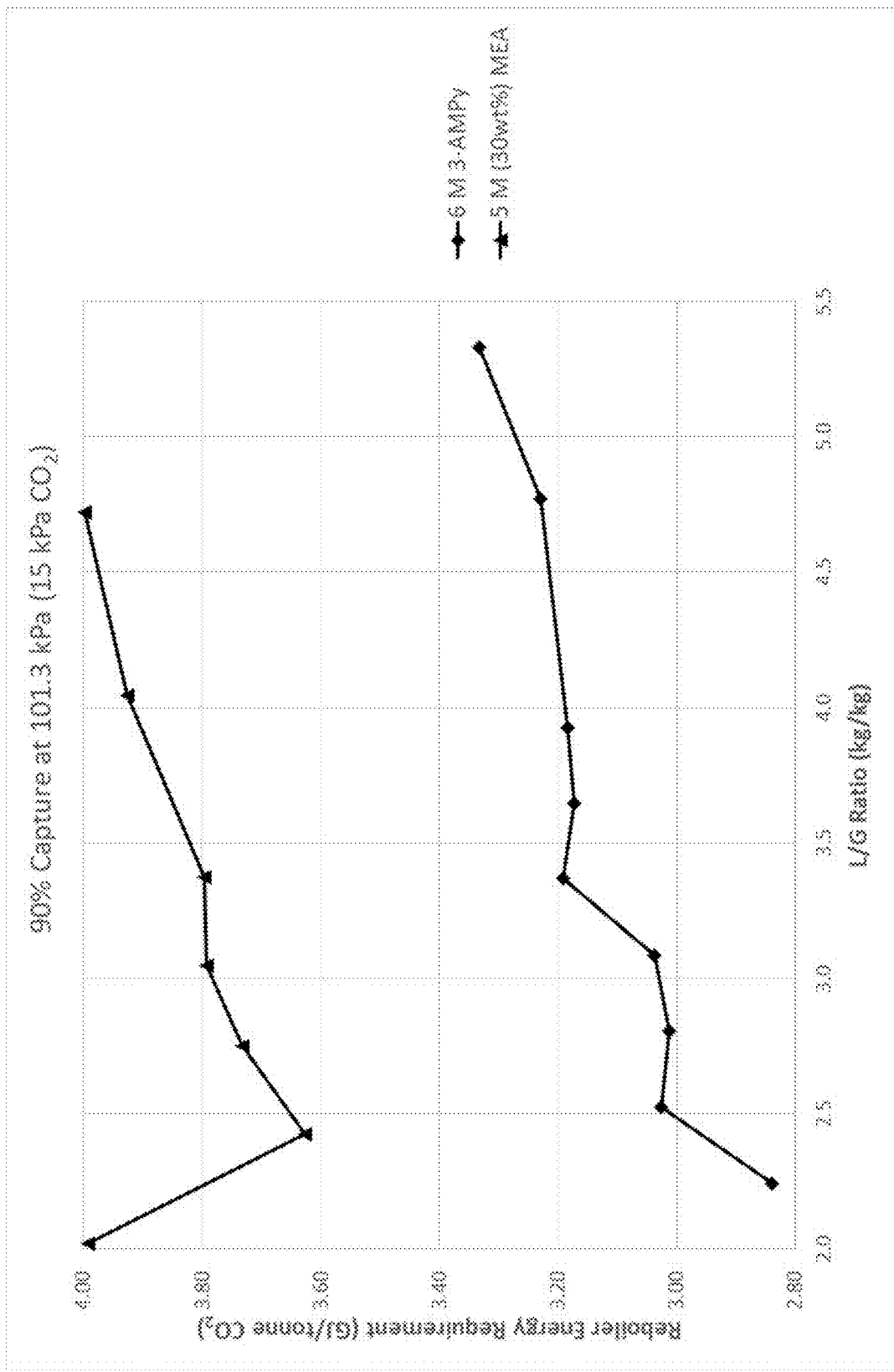
FIG. 8 is a graph comparing the reboiler energy requirement (GJ/tonne $CO_2$) with increasing liquid/gas flow ratio (kg/kg) for 90% capture at 101.3 kPa (15 kPa $CO_2$) for aqueous 6M 3-AMPy against 5M (30 wt %) MEA.

As can be seen in FIG. 8 the energy requirement using aqueous solutions of (aminomethyl)pyridines such as 6M 3-AMPy is much lower than for monoethanolamine (MEA).

Example 5: Pilot Plant Trials Using 3-(Aminomethyl)Pyridine (3-AMPy) Based Absorbents Extended pilot plant trials have been undertaken using a 0.4 tonne/day —$CO_2$ capture plant located at a brown coal power station. The capture plant was operated with a flue gas slip-stream of flow rate 80 m³/hr directly taken from the power station.

Example 5a: Pilot Plant Trials Using Absorbent Containing 6 mol/L Aqueous 3-AMPy (61 wt % 3-AMPy and 39 wt % Water)

The campaign with 6 mol/L Aqueous 3-AMPy was operated for a duration of approximately 1500 hours. During operation the performance of the plant was assessed in terms of reboiler energy requirement and the degradation of the amine was monitored. The single dominant degradation product formed was also identified and characterised. Minimum reboiler duties of 2.9 and 2.6 GJ/tonne $CO_2$ without and with use of the rich split process configuration respectively were achieved. This is compared to 3.3 GJ/tonne $CO_2$ for 5 mol/L monoethanolamine (MEA) in both configurations.

In laboratory testing under accelerated degradation conditions the dominant degradation product formed was found to be an imine dimer of 3-AMPy. Monitoring of loss of amine and formation of the imine was undertaken during the campaign by infrared (IR) spectroscopy and high performance liquid chromatography (HPLC). Additional analysis of plant samples by $^{13}C$ and $^1H$-NMR spectroscopy confirmed that the previously identified imine was the primary degradation product in the plant.

Figure 9:
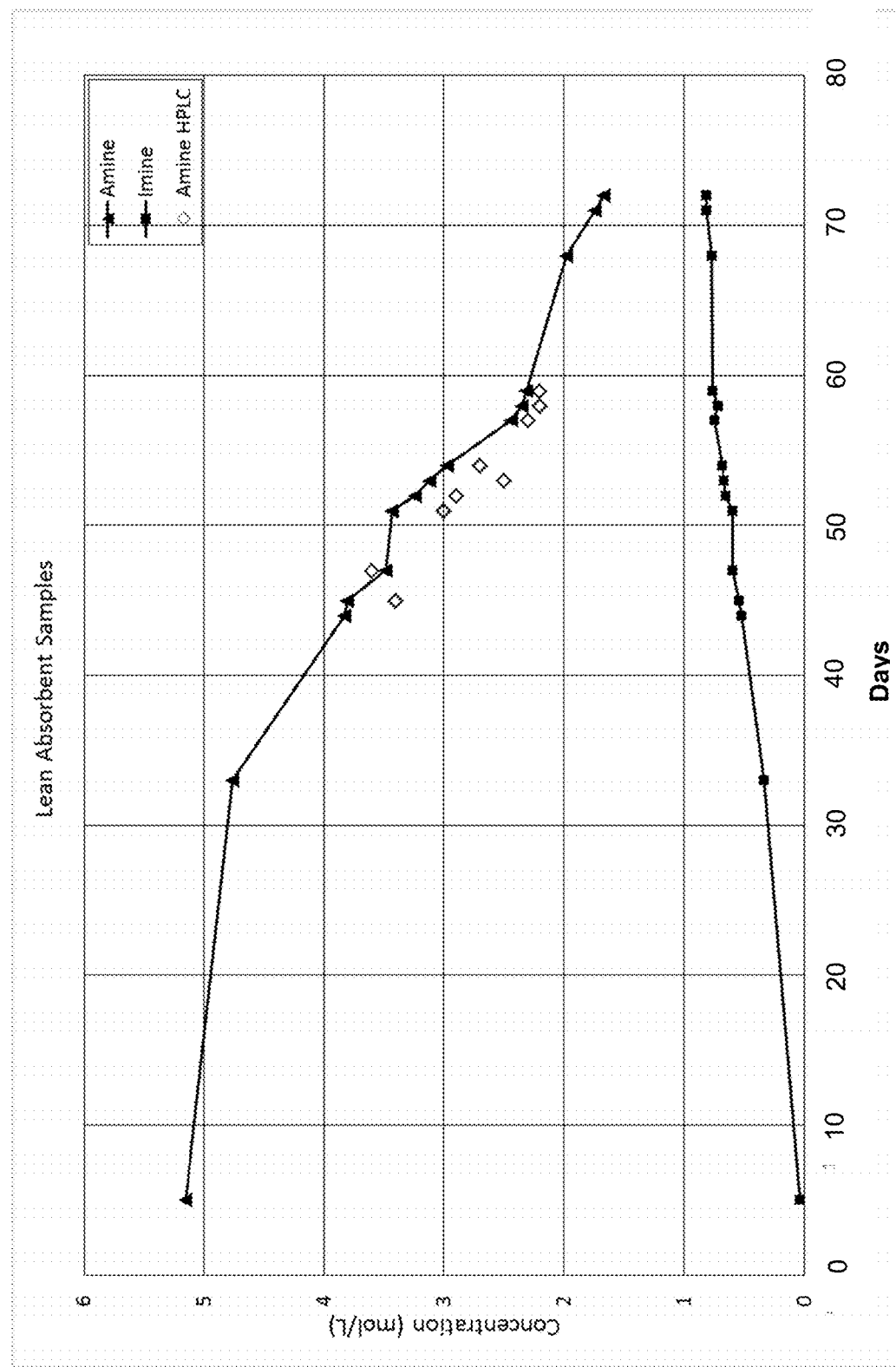
FIG. 9 is a graph showing the 3-AMPy and imine dimer concentration by IR spectroscopy (solid points) and HPLC (circles) over 1500 hours of operation.

FIG. 9 is a plot of the trend in amine and imine concentration during the pilot plant campaign.

During the pilot plant trial the degradation reaction mechanism was investigated in the laboratory by breaking the overall reaction down into the possible individual chemical transformations and testing if they occurred. The determined mechanism proceeds via a protonated 3-AMPy molecule and loss of an ammonium ion followed by oxidation. The complete of degradation mechanism of 3-AMPy to an imine via reaction with oxygen is shown in the following Scheme.

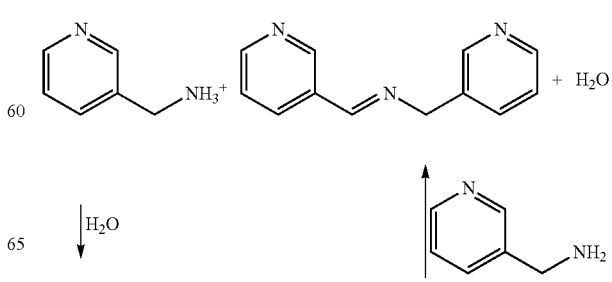

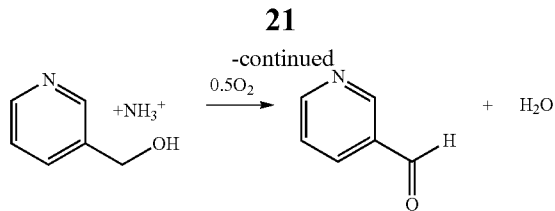

Example 5b: 3 mol/L 3-AMPy and 3 mol/L
2-amino-2-methyl-1-proponal (AMP) (32 wt %
3-AMPy, 26 wt % AMP and 42 wt % Water)

Based on the degradation mechanism of the above scheme it was considered that if 3-AMPy was formulated with a stronger base to reduce the formation of protonated 3-AMPy during $CO_2$ absorption, its degradation could be suppressed. AMP was chosen as the amine for formulation as it has the required basicity and is known to be robust in $CO_2$ capture applications. AMP does not react directly with $CO_2$ but rather acts as a base to preferentially accept the protons released when 3-AMPy reacts. Simulations indicated that the concentrations used in the absorbent of aqueous 3 mol/L 3-AMPy and 3 mol/L 2-amino-2-methyl-1-proponal (AMP) were optimal to reduce degradation and maintain capture performance.

Figure 10:
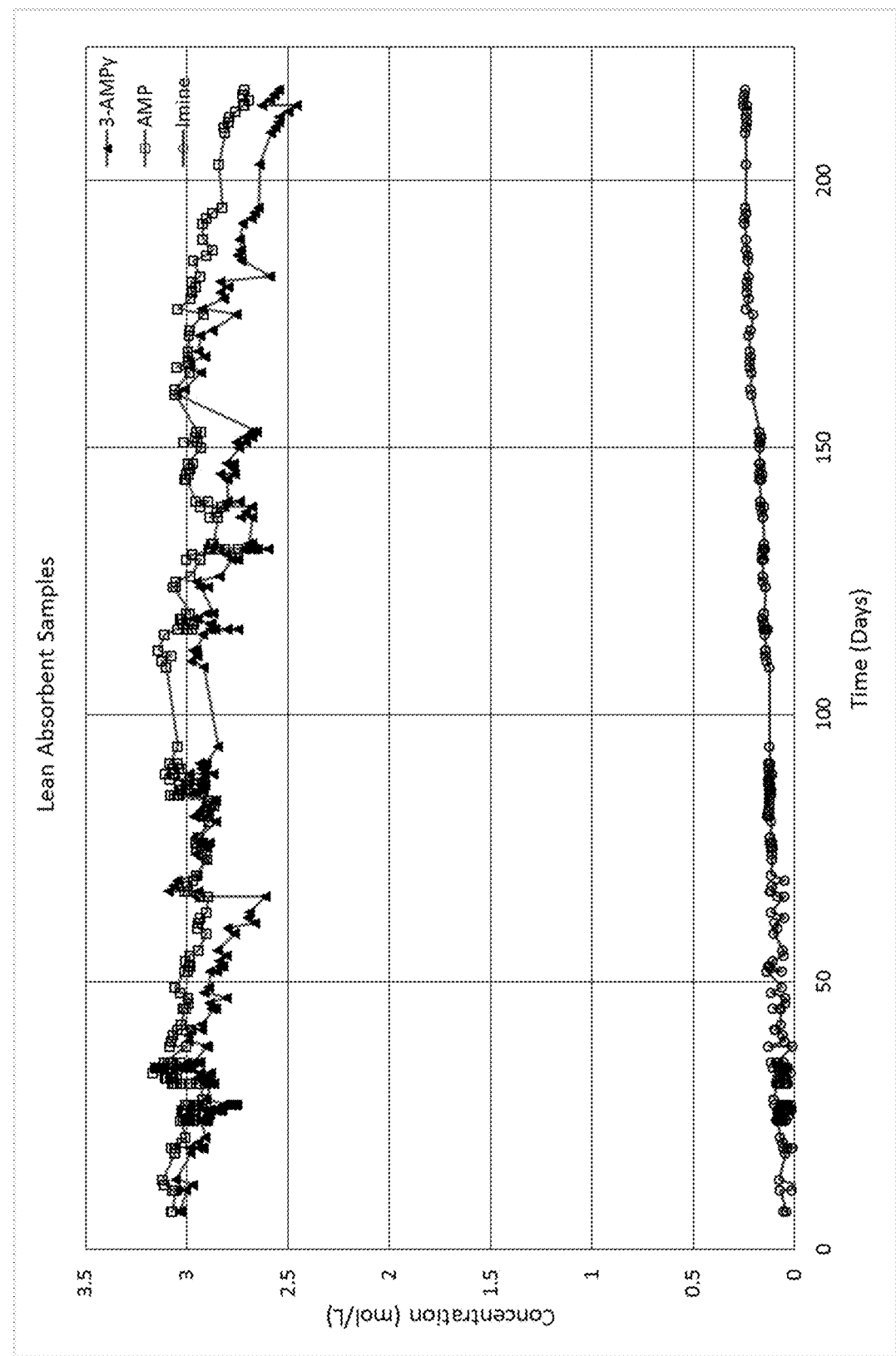
FIG. 10 is a graph showing the change in concentration with time of operation of the pilot plant of 3-AMPy, AMP and imine dimer formed from 3-AMPy using the aqueous absorbent solution containing 3M 3-AMPy and 3M AMP in capture of $CO_2$.

A pilot plant campaign was conducted with the aqueous absorbent of Example 5b for 5000 hours. It was possible to conduct a much longer campaign as the degradation of the absorbent was much slower than the absorbent of Example 5a. The same reboiler energy requirements were achieved as in Example 5a. FIG. 10 shows the concentrations of 3-AMPy, AMP and imine over the duration of the campaign. The rate of imine formation was orders of magnitude lower than seen in the trial of Example 5a. In addition the overall rate of degradation of was found to be 10 times slower than 5 mol/L MEA.

The formation of the imine dimer and inhibition of degradation is a unique property of aminomethylaromatic systems and in particular enhances the performance on aminomethyl substituted heteroaromatics. Aminoalkylpyridine with longer bridging chains such as ethyl and propyl between the amino and pyridine group do not form the imine and degrade via chain loss and more traditional mechanism that form products that cannot be easily regenerated.

FIG. 10 3-AMPy, AMP and imine concentrations measured during the pilot plant campaign by IR spectroscopy over 5000 hours of operation.

In contrast with the reduction in the concentration of 3-AMPy shown in FIG. 9 the composition of Example 5b consisting of aqueous 3 mol/L 3-AMPy and 3 mol/L 2-amino-2-methyl-1-proponal (AMP) (32 wt % 3-AMPy, 26 wt % AMP and 42 wt % water) showed little reduction in the concentration of the amines over the period of 5000 hours operation of the pilot plant under the same conditions.

Example 6: Comparison of the Absorbent of Example 5 with MEA

The pilot plant was also operated with 5 mol/L (30 wt %) aqueous monoethanolamine (MEA) for approximately 500 hours. This allowed optimum reboiler duties to be identified for each absorbent via parametric study. These optimum reboiler duties and rates of amine degradation are shown in Table 6 below and are for the standard plant configuration (no rich split). Note that the MEA degradation information is taken from literature as it was only run for a short duration in the pilot plant.

TABLE 6

|  | 5 mol/L MEA | Example 5a | Example 5b |
|---|---|---|---|
| Reboiler duty (GJ/tonne $CO_2$) | 3.4 | 2.9 | 2.9 |
| Amine degradation rate (kg/tonne $CO_2$) | 1.5* | 23 | 0.16 |

*Degradation rate taken from book P. Feron, Absorption-Based Post-Combustion Capture of Carbon Dioxide, Elsevier (2016).

Example 7: Aniline/Aminopyridines

Aniline and aminopyridine compounds lack the basicity required to effectively act as $CO_2$ absorbents. The $pK_a$ of their conjugate acids is smaller than or similar to that of $CO_2$ in aqueous solution (6.3 at 25° C., T J Edwards, G Maurer, J Newman, J M Prausnitz; AIChE J., 24, 966 (1978)). The pKa of the conjugate bases is shown in Table 7 below. Thus they are unable to accept protons from $CO_2$ ionisation. In addition they will only directly react with $CO_2$ to form a carbamate in the presence of a strong base (P V Kortunov, L S Baugh, M Siskin, D C Calabro; Energy & Fuels, 29, 5967 (2017)). This lower basicisity compared to aliphatic amines is due to the delocalisation of the lone pair of electrons on the nitrogen into the aromatic ring. 4-Aminopyridine is a special case due to the larger $pK_a$ of its conjugate acid, which is in a suitable range for $CO_2$ absorption. This is due to resonance structure stabilisation of the ion, but this stabilisation renders it unable to react directly with $CO_2$ to form a carbamate (A Albert, R Goldacre, J Phillips; J. Chem. Soc., 455, 2240 (1948)).

TABLE 7

| Compound | $pK_a$ of conjugate acid at 25° C. in water |
|---|---|
| Aniline | 4.6 |
| 2-Aminopyridine | 6.7 |
| 3-Aminopyridine | 6.3 |
| 4-Aminopyridine | 9.5 |
| 2-(Aminomethyl)pyridine | 8.7 |
| 3-(Aminomethyl)pyridine | 8.8 |
| 4-(Aminomethyl)pyridine | 8.4 |

Example 8: Stability of Aminoalkylaromatics

Relationship between structural rigidity and $CO_2$ capture performance.

Figure 11:
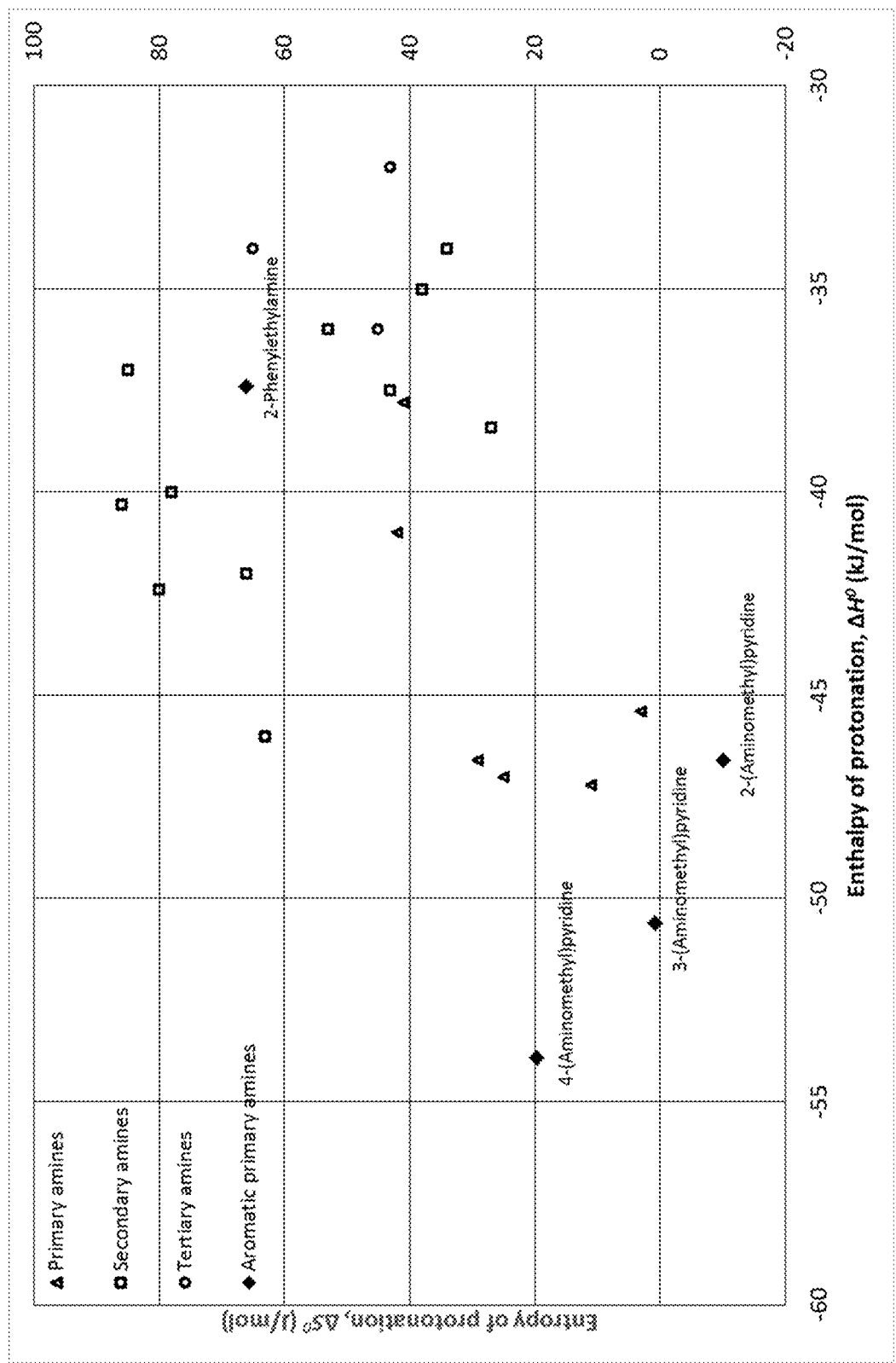
FIG. 11 is a graph which compares the enthalpy and entropy of protonation of a range of amines. The red squares allow comparison of 4 different aminomethyl aromatic compounds and 2-phenyethylamine to illustrate the difference between a methyl linking group and a linking group of an alkyl chain specifically ethyl.

The enthalpy of protonation is an important parameter in aqueous amine absorbents. The larger the enthalpy of protonation the larger the $CO_2$ cyclic capacity that can be achieved via a temperature swing process. A relationship exists between the enthalpy and entropy of protonation and it is described in the publication D Fernandes, W Conway, X Wang, R Burns, G Lawrance, M Maeder, G Puxty; J. Chem. Thermodynamics, 51, 97 (2012). In summary, the more structurally rigid a molecule, the more negative the enthalpy of protonation and smaller and/or more negative the entropy of protonation. This effect is due to reduced internal degrees of freedom resulting in smaller entropy changes upon protonation. Thus aminomethyl substituted heteroaromatic groups have more favourable enthalpy of protonation properties than longer alky chain bridging groups such as ethyl or propyl bridging groups or aliphatic amines. FIG. 11 compares the enthalpy and entropy of protonation of a range of amines. The red squares are allow comparison of 4 different aminomethyl aromatic compounds to 2-phenyethylamine to illustrate this relationship.

Example 9: Bases to Prevent Degradation of (Aminomethyl)Pyridines

As shown in Example 5b the presence of AMP in the absorber composition inhibited the formation of the imine produced by dimerization of the AMPy derivative formed on absorption of $CO_2$. Other bases including amines of higher pKa than the (aminomethyl)pyridine may also be used in this role. Preferred bases are tertiary and sterically hindered amines which are stable and provide a proton accepting role on $CO_2$ absorption. The average $pK_a$ of 2-(aminomethyl) pyridine, 3-(aminomethyl)pyridine and 4-(aminomethyl) pyridine at 25° C. is 8.6

Suitable bases typically have a $pK_a$ at least 0.25 units higher than the pKa of the (aminomethyl)pyridines, that is about 0.25 units higher than 8.6 (this represents a 2.5× increased selectivity for protons). Examples of suitable tertiary and sterically hindered amines include those specified in Table 8 together with the pKa at 25° C.

TABLE 8

| Base | $pK_a$ at 25° C. |
|---|---|
| 2-amino-1-propanol | 9.5 |
| 2-amino-2-methyl-1-propanol | 9.7 |
| piperidine | 11.1 |
| 2-piperidinylmethanol | 10.1 |
| 3-piperidinylmethanol | 10.4 |
| 4-piperidinylmethanol | 10.6 |
| 2-piperidinylethanol | 10.5 |
| 4-piperidinylethanol | 10.6 |
| 2-(dimethylamino)ethanol | 9.2 |

The invention claimed is:

1. A process for absorbing carbon dioxide from a gas stream containing carbon dioxide, comprising contacting the gas stream with an absorbent comprising an aqueous composition comprising:
   (i) at least 10 wt % water;
   (ii) a substituted heteroaromatic compound comprising a six-membered heteroaromatic ring comprising from 1 to 3 nitrogen atoms in the heteroaromatic ring and at least one substituent of formula —$R^1NH_2$ wherein $R^1$ is methylene; and
   (iii) an additional amine selected from tertiary amines, hindered amines and mixtures thereof having a pKa greater than that of the substituted heteroaromatic compound.

2. The process of claim 1, wherein the substituted heteroaromatic compound is selected from formula Ia, Ib, Ic, Id and mixtures of two or more thereof:

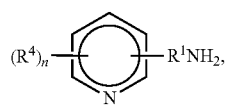

Ia

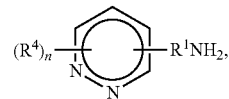

Ib

Ic

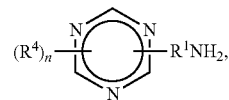

Id wherein
$R^1$ is methylene;
$R^4$ is an optional carbon substituent selected from the group consisting of $C_1$ to $C_4$ alkyl, hydroxy, hydroxy-$C_1$ to $C_4$ alkyl, $C_1$ to $C_4$ alkoxy, $C_1$ to $C_4$ alkoxy-($C_1$ to $C_4$ alkyl); and
n is 0, 1 or 2.

3. The process of claim 1, wherein the substituted heteroaromatic compound is according to formula Ia:

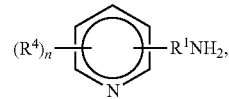

Ia wherein
$R^1$ is methylene;
$R^4$ is an optional carbon substituent selected from the group consisting of $C_1$ to $C_4$ alkyl, hydroxy, hydroxy-$C_1$ to $C_4$ alkyl, —$C_1$ to $C_4$ alkoxy, $C_1$ to $C_4$ alkoxy-($C_1$ to $C_4$ alkyl); and
n is 0, 1 or 2.

4. The process of claim 1, wherein the substituted heteroaromatic compound is selected from the group consisting of:
2-(aminomethyl)pyridine,
3-(aminomethyl)pyridine, and
4-(aminomethyl)pyridine.

5. The process of claim 1, wherein the substituted heteroaromatic compound is 3-(aminomethyl)pyridine.

6. The process of claim 1, wherein the concentration of substituted heteroaromatic compound is 1 wt % to 80 wt % of the aqueous composition.

7. The process of claim 1, wherein the substituted heteroaromatic compound is dissolved in the aqueous composition in an amount of at least 20 wt % of the water content of the aqueous composition.

8. The process of claim 1, wherein the concentration of the substituted heteroaromatic compound is 10 wt % to 80 wt % of the aqueous composition.

9. The process of claim 1, wherein the additional amine comprises a hindered amine containing at least one primary or secondary amino group attached to either a secondary or tertiary carbon atom.

10. The process of claim 1, wherein the additional amine has a pKa at least 8.85 at 25° C.

11. The process of claim 1, wherein the aqueous composition further comprises a carbon dioxide absorbent which is selected from the group consisting of imidazole and N-functionalised imidazole.

12. The process of claim 1, wherein the absorbent comprises:
   10 wt % to 60 wt % of (aminomethyl)pyridine comprising one or more of 2-(aminomethyl)pyridine, 3-(aminomethyl)pyridine and 4-(aminomethyl)pyridine;
   10 wt % to 60 wt % of the additional amine; and
   20 wt % to 80 wt % water.

13. The process of claim 1 wherein the additional amine is selected from the group consisting of 2-amino-1-propanol, 2-amino-2-methyl-1-propanol, piperidine, 2-piperidinylmethanol, 3-piperidinylmethanol, 4-piperidinylmethanol, 2-piperidinylethanol, 4-piperidinylethanol, 2-(dimethylamino)ethanol and mixtures of two or more thereof.

14. A composition of absorbed carbon dioxide comprising:
   A. water in an amount of at least 10 wt % of the composition;
   B. a substituted heteroaromatic compound comprising a six membered heteroaromatic ring comprising from 1 to 3 nitrogen atoms in the heteroaromatic ring and at least one substituent of formula $-R^1NH_2$ wherein $R^1$ is methylene;
   C. an additional amine selected from tertiary amines, hindered amines and mixtures thereof having a pKa greater than that of the substituted heteroaromatic compound; and
   D. absorbed carbon dioxide, wherein the absorbed carbon dioxide is at a concentration above the equilibrium concentration when the composition is exposed to air at below the boiling point of water.

15. The composition of claim 14, wherein the absorbed carbon dioxide constitutes at least 1% absorbed carbon dioxide by weight based on the total weight of the composition.

16. The composition of claim 14, wherein the substituted heteroaromatic compound is selected from formula Ia, Ib, Ic, Id and mixtures of two or more thereof:

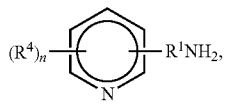
Ia

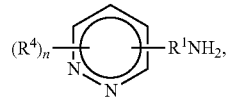
Ib

Ic

Id wherein
$R^1$ is methylene;
$R^4$ is an optional carbon substituent selected from the group consisting of $C_1$ to $C_4$ alkyl, hydroxy, hydroxy-$C_1$ to $C_4$ alkyl, $C_1$ to $C_4$ alkoxy, $C_1$ to $C_4$ alkoxy-($C_1$ to $C_4$ alkyl); and
n is 0, 1 or 2.

17. The composition of claim 14, wherein the substituted heteroaromatic compound is selected from the group consisting of:
   2-(aminomethyl)pyridine;
   3-(aminomethyl)pyridine; and
   4-(aminomethyl)pyridine.

18. The composition of claim 14, wherein the composition comprises:
   10 wt % to 60 wt % of (aminomethyl)pyridine comprising one or more of 2-(aminomethyl)pyridine, 3-(aminomethyl)pyridine and 4-(aminomethyl)pyridine;
   10 wt % to 60 wt % of the additional amine; and
   20 wt % to 80 wt % water.

19. The composition of claim 14, wherein the additional amine has a pKa at least 8.85 at 25° C.

20. The composition of claim 14, wherein the additional amine is selected from the group consisting of 2-amino-1-propanol, 2-amino-2-methyl-1-propanol, piperidine, 2-piperidinylmethanol, 3-piperidinylmethanol, 4-piperidinylmethanol, 2-piperidinylethanol, 4-piperidinylethanol, 2-(dimethylamino)ethanol and mixtures of two or more thereof.

* * * * *